United States Patent
Ruget et al.

(10) Patent No.: US 7,096,473 B2
(45) Date of Patent: Aug. 22, 2006

(54) COMPUTER SYSTEM WITH AN IMPROVED DEVICE AND DRIVER FRAMEWORK

(75) Inventors: Frederic Ruget, Nanterre (FR); Vladimir Grouzdev, Saint Germain en Laye (FR); Eric Lescouet, Paris (FR)

(73) Assignee: Sun Microsystems, Inc., Santa Clara, CA (US)

( * ) Notice: Subject to any disclaimer, the term of this patent is extended or adjusted under 35 U.S.C. 154(b) by 773 days.

(21) Appl. No.: 10/171,104

(22) Filed: Jun. 13, 2002

(65) Prior Publication Data

US 2003/0233487 A1     Dec. 18, 2003

Related U.S. Application Data

(63) Continuation of application No. PCT/IB99/02006, filed on Dec. 15, 1999.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................... 719/321

(58) Field of Classification Search ........ 719/321–327; 710/8, 10; 713/1, 2, 100
See application file for complete search history.

(56) References Cited

U.S. PATENT DOCUMENTS 5,465,364 A * 11/1995 Lathrop et al. ............. 719/321
5,802,365 A * 9/1998 Kathail et al. .............. 719/321
5,926,775 A * 7/1999 Brumley et al. ............ 702/127

OTHER PUBLICATIONS

Midha, Writing Device Drivers for the Solris OS (x86 Platform Edition), developer.sun.com, pp. 1-5, Jan. 1999.*
Sun Microsystems, ChorusOS 4.0 Device Driver Framwork Guide, Jan. 12, 1999.*
"How Sun Drives Wireless Architectures to 3G and Beyond" *Enabling The Wireless Net Effect* Part No. FE1431-0, SunWin No. 126239, Oct. 2000, Revision 11.

* cited by examiner

*Primary Examiner*—William Thomson
*Assistant Examiner*—Diem Cao
(74) *Attorney, Agent, or Firm*—Meyertons Hood Kivlin Kowert & Goetzel, P.C.; B. Noël Kivlin; Rory D. Rankin

(57) ABSTRACT

Each driver has a global driver section comprising drive program code and global driver data, both defining driver operations associated with a corresponding class of devices. Each device has an associated driver instantiation comprising local driver data, having an internal pointer to the global driver section of the instantiated driver, and possibly at least one external pointer to another driver instantiation. A device registry forms a list of device registry entries, each corresponding to a respective one of the drive instantiations. Driveer client code may perform operations on a given device by fetching in the device registry a pointer to the driver instantiation associated with the given device, and then use operations provided by the associated driver instantiation, directly or using further operations reached in other driver instantiations by using iteratively the external printer.

48 Claims, 13 Drawing Sheets

| Services | Base level | DKI thread | Interrupt | Blocking |
|---|---|---|---|---|
| svDkiThreadCall | + | + | - | + |
| svDkiThreadTrigger | + | + | + | - |

FIG. 14 - TABLE T1

| Services | Base level | DKI thread | Interrupt | Blocking |
|---|---|---|---|---|
| svDriverRegister | + | + | - | + |
| svDriverLookupFirst | + | + | - | + |
| svDriverLookupNext | + | + | - | + |
| svDriverRelease | + | + | - | + |
| svDriverEntry | + | + | - | - |
| svDriverCap | + | + | - | - |
| svDriverUnregister | + | + | - | + |

FIG. 16 - TABLE T3

| Services | Base level | DKI thread | Interrupt | Blocking |
|---|---|---|---|---|
| dtreeNodeRoot | - | + | - | - |
| dtreeNodeChild | - | + | - | - |
| dtreeNodePeer | - | + | - | - |
| dtreeNodeParent | - | + | - | - |
| dtreeNodeAlloc | + | + | - | + |
| dtreeNodeFree | + | + | - | + |
| dtreeNodeAttach | - | + | - | - |
| dtreeNodeDetach | - | + | - | - |
| dtreePropFind | - | + | - | - |
| dtreePropFindNext | - | + | - | - |
| dtreePropLength | - | + | - | - |
| dtreePropValue | - | + | - | - |
| dtreePropName | - | + | - | - |
| dtreePropAlloc | + | + | - | + |
| dtreePropFree | + | + | - | + |
| dtreePropAttach | - | + | - | - |
| dtreePropDetach | - | + | - | - |
| dtreeNodeAdd | - | + | - | + |
| dtreeNodeFind | - | + | - | - |
| dtreePropAdd | - | + | - | + |

FIG. 15 – TABLE T2

| Services | Base level | DKI thread | Interrupt | Blocking |
|---|---|---|---|---|
| svDeviceAlloc | + | + | - | + |
| svDeviceFree | + | + | - | + |
| svDeviceRegister | + | + | - | + |
| svDeviceUnregister | + | + | - | + |
| svDeviceEvent | + | + | + | - |
| svDeviceLookup | + | + | - | + |
| svDeviceRelease | + | + | - | + |
| svDeviceEntry | + | + | - | - |

FIG. 17 - TABLE T4

| actions | SYS SHUTDOWN | DEV SHUTDOWN | DEV REMOVAL |
|---|---|---|---|
| notify child drivers | + | + | + |
| notify driver clients | - | + | + |
| abort operations in progress | - | - | + |
| reset hardware | + | - | - |

FIG. 18 - TABLE T5

| actions | DEV SHUTDOWN | DEV REMOVAL |
|---|---|---|
| reset hardware | + | - |
| release system resources | + | + |
| close connection to the parent driver | + | + |

FIG. 19 - TABLE T6

COMPUTER SYSTEM WITH AN IMPROVED DEVICE AND DRIVER FRAMEWORK

This application is a continuation of International Application PCT/IB99/02006, with an international filing date of Dec. 15, 1999.

BACKGROUND OF THE INVENTION

This invention relates to computer technology.

Real time embedded operating systems are of increasing interest in various applications. An example is the operating system (OS) named ChorusOS (a product and trademark of SUN MICROSYSTEMS), which is flexible as to the hosting hardware. This means that it may have to be installed and configured on a variety of computer platforms.

For being installed on a particular machine ("target"), an OS like ChorusOS has to be prepared in accordance with the target characteristics, including its main board, the corresponding board support package (BSP), and its specific drivers. Usually, the target will include additional devices, also with their own drivers.

SUMMARY OF THE INVENTION

Thus, in view of the desired flexibility, a number of different drivers may have to be loaded, depending upon the systems. The ability to hot swapping a device is also desirable. Hot swap means maintaining the system functions for the time interval extending from unplugging an existing device to plugging in a new device in substitution of the unplugged existing device. In other words, hot swap includes both hot unplug and hot plug, and continue to play while maintaining system functions in each case.

This invention intends to improve the driver and device framework in such a system.

Another object of this invention is to provide a very scalable way to configure/initialize a set of device drivers to operate a hardware platform.

Another object of this invention is to provide a driver and device framework adapted to range from low memory footprint static software configurations, where a built-in driver is statically bound to each supported device, to very large hardware and software configurations where the set of physical devices is not known a priori.

A further object of this invention is to enable devices to be dynamically added in/removed from the system, and/or to enable devices to be dynamically probed.

Still another object of this invention is to enable the downloading of drivers from the network.

The invention applies to a computer system comprising a processor, a memory, devices, and a program memory area, for storing an operating system, drivers, and driver client code (applications).

Each driver has a global driver section comprising driver program code and global driver data, both defining driver operations associated with a corresponding class of devices.

For each operative one of the devices, there is provided an associated driver instance comprising local driver data. The local data may have an internal pointer to the instantiated driver. They may also have at least one external pointer to another driver instance. The local driver data may still further comprise local device data, defining a current condition of the associated device.

A device registry forms a list of device registry entries, each corresponding to a respective one of the driver instances. A driver client code is thus capable of performing operations on a given device by:

fetching in the device registry a pointer to the driver instance associated with the given device, performing the given device operations provided by the associated driver instance, directly or using further operations reached in other driver instances by using iteratively said external pointer.

The invention may also be defined as a method of managing drivers, or a driver framework, in a computer, comprising the steps of:

a. providing each driver with a global driver section comprising driver program code and global driver data, both defining driver operations associated with a corresponding class of devices, b. for each operative one of the devices, providing an associated driver instantiation comprising local driver data, having an internal pointer to the instantiated driver, c. providing a device registry, forming a list of device registry entries, each corresponding to a respective one of the driver instantiations.

Thus, a device call may be directed to the device registry, to reach the driver instantiation corresponding to the device being called.

Preferably, provision is made for device tree data, defining a tree representation of at least some of the devices. In the tree, each device node represents a device and its device characteristics, and identifies at most one driver capable of managing that device. The device registry entry may further comprise a node identifier, defining an associated node in the device tree.

On another hand, the global driver section may comprise code adapted to implement at least one of the following special operations, non limitatively: self-registering the driver in the driver registry, identifying devices the driver can serve, creating a node in the device tree, binding a device with a driver, creating a new driver instance, unloading a driver.

According to another feature, there is provided for a driver registry, forming a list of driver registry entries, each comprising at least one pointer to the special operations. The driver registry may directly or indirectly define device-independent driver characteristics, comprising a driver identifier and a parent driver class identifier. In particular drivers, the global driver section may comprise code adapted to explore the driver registry for finding drivers matching the class of the particular driver.

The invention also includes the software code portions being used, including individual driver code, and portions of code in the operating system, or in its nucleus, which implement the functionalities of this invention.

BRIEF DESCRIPTION OF THE DRAWINGS

Other features and advantages of the invention will appear in the detailed description below and in the appended drawings, in which:

FIG. 14 shows table T1, useful for the detailed description;

FIG. 15 shows table T2, useful for the detailed description;

FIG. 16 shows table T3, useful for the detailed description;

FIG. 17 shows table T4, useful for the detailed description;

FIG. 18 shows table T5, useful for the detailed description; and

FIG. 19 shows table T6, useful for the detailed description.

Additionally, the detailed description is supplemented with Exhibits, in which:

Exhibit A contains pseudocode of various routines in C type language; and

Exhibit B contains comments on the routines of Exhibit A, using a corresponding paragraph numbering.

The Figures and Exhibits include graphical and/or code information, which may be useful to define the scope of this invention.

DETAILED DESCRIPTION

Making reference to software entities imposes certain conventions in notation. For example, in the detailed description, the quote sign " may be used as a string delimiter wherever deemed necessary for clarity (e.g. "actor"). Square brackets may be used to frame the optional portion of an expression (e.g. "[OS] archive").

The detailed description hereinafter refers to platforms based on the ChorusOS operating system, and uses the corresponding terminology. This is exemplary only and it should be understood that the invention is applicable to a variety of computer platforms. Generally, ChorusOS has the following abilities:

work with various processors and various main boards, adapted to specific products;

be loadable in RAM from a so called "[OS] archive" or "image file", stored e.g. in persistent memory or as a file on the hard disk, depending upon the actual platform architecture;

define independent processes (named "actors"), exchanging messages.

Figure 1:
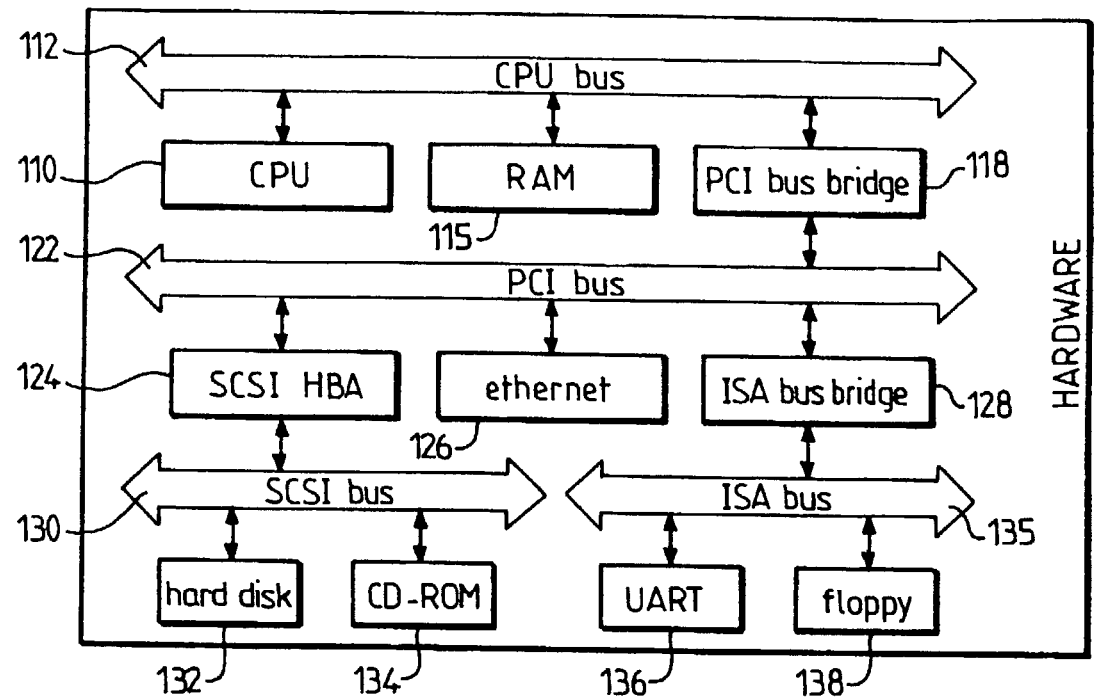
FIG. 1 schematically illustrates a hardware computer structure in which the invention may be practiced.

The exemplary hardware computer structure of FIG. 1 comprises a CPU 110, having a CPU Bus 112, and RAM 115 connected thereto. A PCI Bus Bridge 118 is interposed between CPU Bus 112 and PCI Bus 122. PCI Bus 122 in turn is connected to an Ethernet device 126, an SCSI Host Bus Adapter 124, and an ISA Bus Bridge 128. SCSI Host Bus Adapter 124 is connected to SCSI Bus 130, which is connected to one or more hard disks 132, and one or more CD-Rom drives 134. ISA Bus 135 is connected to one or more UART devices 136, and to one or more floppy drives 138.

As known, the devices necessitate pieces of code named drivers to be able to correctly operate. In accordance with one aspect of this invention, the tendency is to systematically have one driver for each device, with the driver services being those required for the device.

Figure 2:
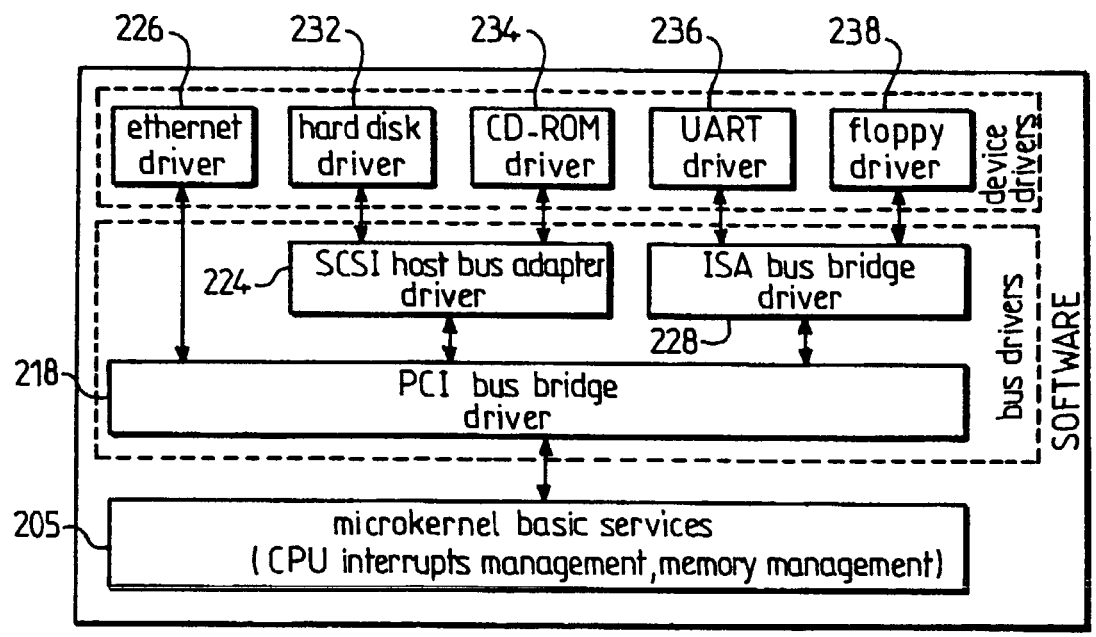
FIG. 2 schematically illustrates a device driver system for the hardware computer structure of FIG. 1.

Accordingly, the device driver framework has the structure shown in FIG. 2. The micro kernel basic services, including CPU Interrupt management and memory management, form a module 205, with PCI Bus Bridge driver 218 connected thereto. Module 218 in turn receives connection from SCSI Host Bus Adapter driver 224, and from ISA Bus Bridge driver 228, as well as from an Ethernet peripheral driver 226. SCSI Host Bus Adapter driver 224 has one or more hard disk drivers 232, one or more CD-Rom drivers 234. ISA Bus Bridge driver has one or more UART drivers 236 and one or more floppy drivers 238.

The Interface layering will now be described with reference to FIG. 3. The interfaces specified by ChorusOS for the device drivers implementation are split logically in two sets:

Drivers/Kernel Interface (DKI), which comprise a set of services provided by the microkernel 205 for driver implementation. In other words, all DKI services are implemented in the microkernel, and used by device drivers. Typically drivers for buses and devices connected to the CPU local bus will use all DKI services.

Device Drivers Interface (DDI), which comprises a set of services provided by drivers for the driver clients implementation. In fact, a driver client may itself be a driver. For instance a device driver is typically a bus driver client. Thus, all DDI services are implemented in a driver, and used by the upper layer drivers, or directly by drivers client applications.

The DKI interface defines all microkernel services provided for drivers implementation. These services are split in two categories. Common DKI services 207 have the same API for all platforms and processors, and are usually used by all kind of drivers, whatever the layer level is. Processor family specific DKI services 206 may have a different API for each different processor family and are usually used only by the lowest-level drivers, i.e. drivers for buses and devices which are directly connected to the CPU local bus 112 (FIG. 1).

The Processor family specific DKI services 206 cover: Processor interrupts management, Processor caches management, Processor specific I/O services and Physical to virtual memory mapping. Some or all of these services exist, and may be implemented in known fashion. These DKI services operate with the CPU bus (the root of the device tree) to some extent like DDIs with devices; there is a DKI service for each particular CPU bus function, and the design of the DKI services is rendered modular, thus improving the portability.

Figure 3:
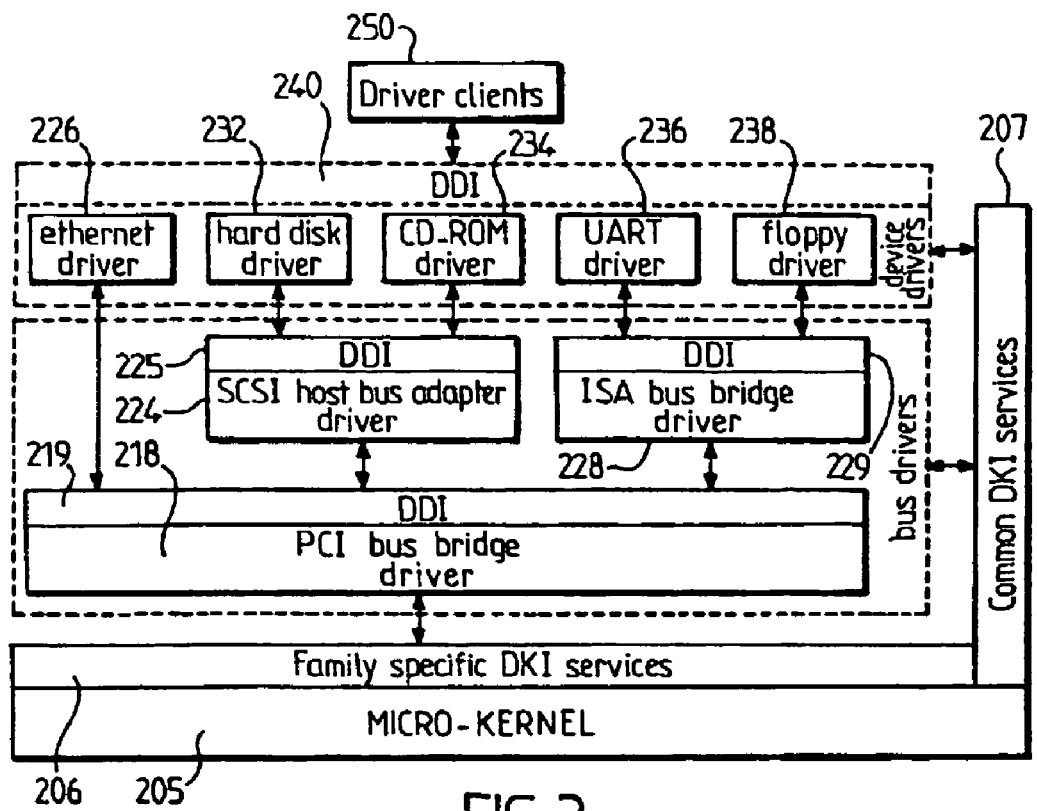
FIG. 3 illustrates a device driver framework in accordance with an embodiment of the invention for the hardware computer structure of FIG. 1.

FIG. 3 also shows that the other drivers have interfaces arranged as DDI services as follows:

DDI 219 for PCI bus bridge driver 218;

DDI 225 for SCSI host bus adapter driver 224;

DDI 229 for ISA bus bridge driver 228; and

DDI 240 diagrammatically showing the DDIs for all other end drivers, communicating with driver clients 250 in application programs.

Figure 4:
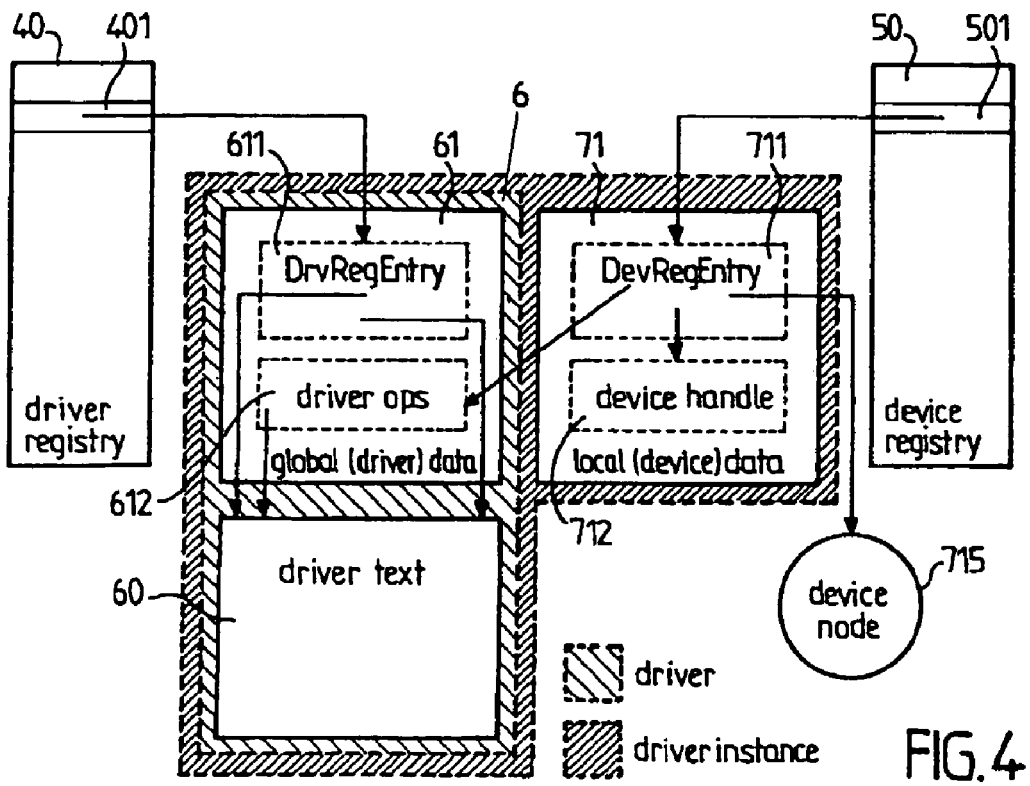
FIG. 4 illustrates a device registry and a driver registry, cooperating with a global driver and an instantiation of that global driver.

FIG. 4 shows a driver registry 40, having a particular driver record 401, and a Device Registry 50, having a particular device record 501.

Many drivers exist. Only one is shown in FIG. 4 for clarity. A driver 6 has driver program code ("driver text") 60 and global driver data 61, comprising:

a driver operations section ("driver ops") 612, adapted to provide services or functions, using driver program code 60, and a driver registry entry section ("DrvRegEntry") 611. Driver record 401 has a pointer to "DrvRegEntry" 611 of the particular driver 6 being considered. For initialization and shut-down, the "DrvRegEntry" 611 may optionally define entry points to device independent routines in the driver, e.g. "drv_probe", "drv_bind", "drv_init" and "drv_unload", to be discussed hereinafter.

Figure 5:
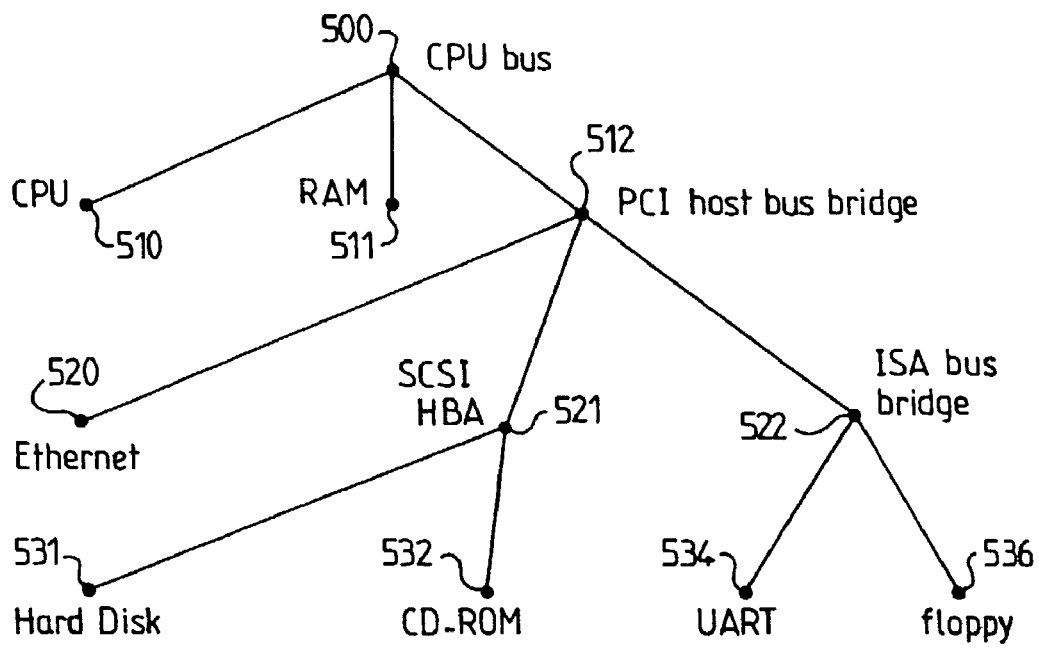
FIG. 5 illustrates an exemplary device tree.

As shown in FIG. 5, the exemplary device structure of FIG. 1 can be rearranged into a tree, having a root 500 constituted by the CPU Bus. The CPU and RAM appear as leaf nodes 510 and 511. PCI Host Bus Bridge is an internal node or "bus/nexus" 512, which has subnodes SCSI HBA 521, and ISA Bus Bridge 522, and leaf node 520 for an Ethernet device. In turn, SCSI HBA 521 node has subnodes 531 for the hard disk and 532 for a CD-ROM drive. Also ISA Bus Bridge node 522 has subnodes 534 for the UART and 536 for a floppy disk drive. The peripheral devices are leaf nodes (more briefly "leaves") in the tree, here CPU, RAM, Ethernet, Hard disk, CD-Rom, UART and floppy.

As above indicated, e.g. one or more hard disks may be provided. In the case of two hard disks, there are of course two hard disk leaf nodes connected e.g. to SCSI HBA nexus 521.

In this invention, driver 6 of FIG. 4 is a generic driver object or "global" driver section, which is not used as such by devices. In accordance with the concepts of object programming, the devices needing the services of the particular driver 6 will use "instances" of the object (object class) defined by driver 6.

Such an instance basically comprises "local" driver data 71, defining the instance, together with the global driver section. The local driver data 71 comprises data forming an "internal" pointer to the driver object 6. "Internal" means that the pointer connects the driver instance to the global driver section within the driver. In other words, a driver instance comprises its local driver data plus the global driver section. Preferably, the local driver data 71 also comprises data forming an "external" pointer to at least one other driver, typically the parent driver (the root's parent driver are the DKI services).

The local driver data 71 may also include local device-oriented data, defining, in section 712:

data defining the current condition of the local device, and a device handle, for the local device associated with the driver instance.

Consideration is now given to the case of a driver instantiation for a leaf device in FIG. 4, i.e. one of the devices directly communicating with driver clients in FIG. 3. Such a leaf driver instance is also associated with a "Device registry entry". In FIG. 4, the device registry entry is shown as a section 711 in "local" device data 71 of the driver instance (However, the Device registry entry may alternatively be associated with the corresponding record 501 in device registry 50). In any case, each item in the Device Registry 50 in FIG. 4 has a corresponding "DevRegEntry" structure 711, which is exemplified in pseudocode in Exhibit A-1, and commented in Exhibit B-1.

Device registry 50 forms the basis of a client-to-[leaf]-driver linking mechanism. For subsequently reaching a bus/nexus driver, a child-to-parent-driver linking mechanism is used.

Figure 6:
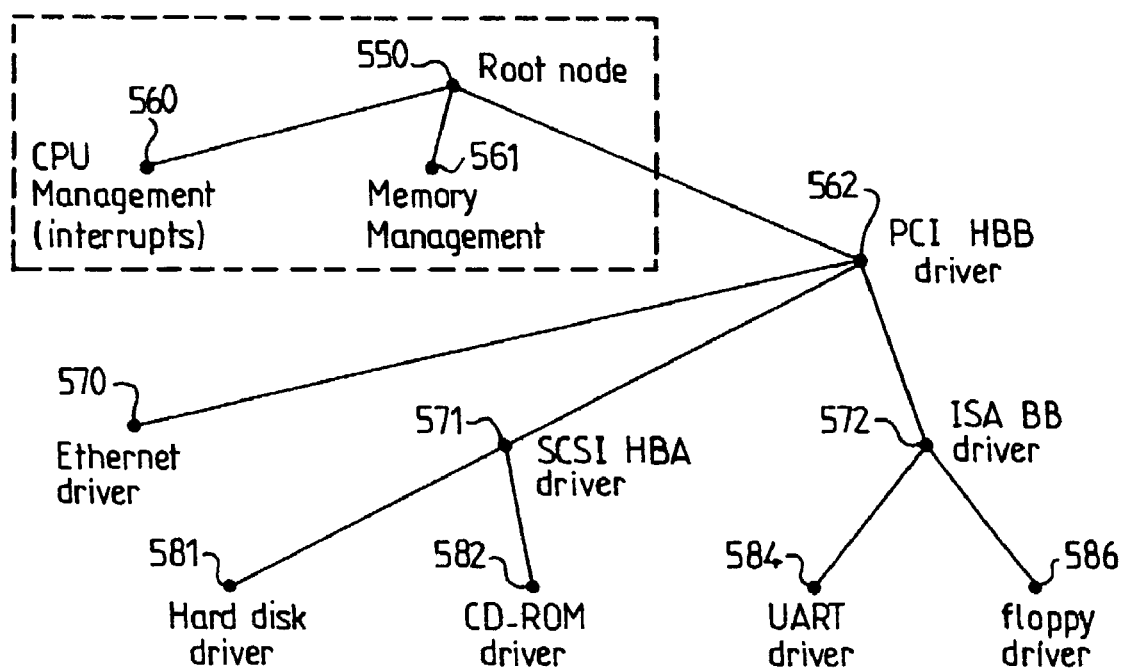
FIG. 6 illustrates a corresponding exemplary driver tree.

As shown in FIG. 6, the device related software may also be defined and split in accordance with a tree structure, in parallelism with the device tree. The tree includes a root node 550, which has a CPU management leaf 560, for example for interrupts, and a memory management leaf 561, plus the PCI HBB driver nexus 562. This nexus in turn has an Ethernet driver leaf 570, and two sub-nexus:

SCSI HBA driver 571, with hard disk driver leaf 581 and CD-ROM driver leaf 582, and ISA BB driver 572, with UART driver leaf 584 and floppy driver leaf 586.

As reflected by the dashed line frame in FIG. 6, a portion of the device related software, e.g. the CPU management and memory management, is part of the nucleus of the OS, rather than of the driver framework as such. When restricting the driver tree of FIG. 6 to the drivers per se, its root is the PCI HBB driver nexus 562.

The device tree of FIG. 5 is preferably represented as such in the code. By contrast, the driver tree of FIG. 6 is virtual, i.e. is defined only by the fact each device in the device tree of FIG. 5 should normally have a corresponding driver instantiation.

A computer in operation will now be considered. It is assumed that driver registry 40 contains drivers as required to satisfy the following conditions:

each bus/nexus node in operation has found at least one driver matching its own needs, and a driver instance for that nexus node has been created;

each leaf node in operation has been provided with at least one driver matching its own needs, and a driver instance for that leaf node has been created;

each device having a leaf driver instance has a Device registry entry, accessible through device registry 50.

When a driver client 250 wishes to access a particular leaf device, e.g. hard disk 132, to perform a given operation on it, the process is as follows:

the device is searched for in device registry 50, finding e.g. record 501, and the DevRegEntry 711 in the driver instance 232 corresponding to that device;

in turn, DevRegEntry 711 points to driver operations in 612, which are thus made available to the device;

the adequate device handle is given by the data in 712; this handle is a pointer to associate internal data of the driver instance with the device using these data;

a pointer to the corresponding device 715 is also available (or, if the device tree structure is used at this stage, a pointer to the corresponding device node in the device tree);

if the operation needs, another driver is called to help in executing that operation, using further external pointer(s); this is repeated as necessary.

Thus, in a computer in operation, all that is necessary to process a call from an application (client 250) to a particular leaf device may be made available by the cooperation of device registry 50 with the corresponding local data 71.

A more detailed description will now be given, including the driver initialization (and, optionally, shutdown).

The common DKI services 207 include a "DKI thread", launched by the microkernel at initialization time. The DKI thread is part of the nucleus (or nucleus actor in ChorusOS) of the operating system. The DKI thread serves as a mechanism to synchronize same calls to DKI and DDI services issued from different threads at drivers initialization time, and also at runtime (if required, e.g. for initialization and shutdown of drivers). Thus, using the DKI thread avoids the need for other synchronization mechanism (locks) in the driver implementations themselves.

Normally, all calls related to initialization/shutdown of the drivers are done implicitly in the context of the DKI thread. Since the corresponding driver routines are called directly from the DKI thread, there is no need for code taking care of synchronization. However, a driver may explicitly use DKI thread services to ensure synchronization in certain special cases, like hot-pluggable device drivers, or deferred initialization and shutdown process, which are described later on.

The basic calls to the DKI thread are exemplified in pseudocode in section A-2 of Exhibit A, and described in more detail in section B-2 of Exhibit B. The contexts in which a caller is allowed to invoke each service are shown in the table T1 of FIG. 14. The possible calling contexts in the tables are:

Base level: the service may be called from any thread base level context.

DKI thread: the service may be called from DKI thread context.

Interrupt: the service may be called from interrupt context, i.e. from the context of an interrupt handler.

Blocking: the service may block and preempt the caller.

Other features of the Common DKI 207 are: Device tree, Driver registry, and Device registry. Common DKI 207 may also include other services not related to this invention: General purpose memory allocation, Timeout, Precise busy wait, Special purpose physical memory allocation, System event management, Global interrupts masking, and Specific I/O services. Again, there is a DKI service for each particular common function, i.e. the design of the DKI services is rendered modular.

The device tree is a data structure which provides a description of the hardware topology and device properties. Tree services are available from a device tree API, exemplified in pseudocode in section A-3 of Exhibit A, and described in more detail in section B-3 of Exhibit B. In these examples, "DevNode" is an abstract type designating a device node object, and is opaque for the driver. More precisely:

functions A-3.1 described in B-3.1 define a low-level API section related to the device tree browsing;

functions A-3.2 described in B-3.2 define a low-level API section related to the device tree topology modification;

functions A-3.3 described in B-3.3 define a low-level API section related to the properties of the device tree nodes;

From the above low-level functions, an API section offering Device tree high-level services is built, implementing some useful services for building and searching the device tree, to avoid having low level code implemented in all device tree users. Functions A-3.4 described in B-3.4 define these Device tree high-level services. Table T2 of FIG. 15 specifies the contexts in which a caller may be allowed to invoke each low-level or high level service. Building the above functions on a tree structure is considered accessible to men skilled in the art, using Exhibits A and B as necessary.

The hardware topology of the devices is specified in terms of parent/child relationships. Each device node in the tree is associated with device properties, which are device specific. A device property is a "name/value" pair. The property "name" is e.g. a null terminated ASCII string. The property "value" is a sequence of bytes specified by the "length/ address" pair. The property value format is property specific and may have to be standardized between the given producer and its consumers. For instance, certain device node properties are related to the bus resources required and/or allocated for the device (e.g. interrupt lines, I/O registers, DMA channels). Such properties are preferably standardized, in order to be understood by the bus driver as well as by device drivers connected to the given bus.

Preferably, a device registry microkernel module ("device registry API") implements a data base of driver instances servicing devices currently supported by the operating system. The device registry data base has been populated by drivers at device initialization time. The device registry data base is accessed by driver clients in order to obtain a pointer to the driver instance servicing a given (logical) device.

Device registry management services or functions (the API) are exemplified in pseudocode from A-4.1 to A-4.8 and described in corresponding sections B-4.1 to B-4.8. Table T4 in FIG. 17 specifies the contexts (as defined above) in which a caller is allowed to invoke each service. Note that only the "svDeviceLookup", "svDeviceRelease" and "svDeviceEntry" microkernel calls should be used by driver clients 250. The rest of the API is dedicated to device drivers.

Preferably, the driver code in each driver 6 contains a "main" routine, for performing self-registration of the driver in Driver registry 40.

Driver registry module 40 implements a data base of drivers, which is useful for driver initialization and shutdown. Each item in the Driver Registry 40 in FIG. 4 has a pointer to the "DrvRegEntry" structure 611, which is exemplified in pseudocode in A-5, and commented in B-5.

Driver registry management services or functions (an API) are exemplified in pseudocode from A-6.0 to A-6.6 and described in corresponding sections B-6.0 to B-6.6. Table T3 in FIG. 16 specifies the contexts (as defined above) in which a caller is allowed to invoke each service.

Each driver's "DrvRegEntry" structure 611 may include one or more driver management oriented functions, or driver entry points. The three following functions may be invoked by a bus/nexus driver when the "bus_class" specified in the driver registry entry matches the bus/nexus class:

"drv_probe", which is able to detect device(s) residing on the bus, with a view to create a device node for each such device.

"drv_bind", which checks whether a detected device may be serviced by the driver.

"drv_init", which creates an instance of driver servicing the "bound" device, and performs other steps as necessary for full driver/device cooperation.

A fourth function, "drv_unload", may be invoked by the driver registry module when an application wishes to unload a driver component from the system.

In "DrvRegEntry" structure 611, the "bus_class" and "bus_version" fields specify a parent bus/nexus API required for the driver. Such an API is provided to the driver as a structure of indirect functions implementing the bus API service routines. For instance, the "pci" bus API is specified by the "PciBusOps" structure, the "is a" bus API is specified by the "IsaBusOps". When a bus driver invokes the "drv_probe" or "drv_init" driver's routine, it gives a pointer to the structure of the bus service routines, in its driver global section. The structure type corresponds to the "bus_ class" field value.

Accordingly, the following will refer to a "bus_ops"+ "bus_id" pair, which specifies the parent driver of a current driver. "bus_ops" points to a structure of service routines implementing a bus driver API in the parent driver. Such a structure is bus class specific, i.e. several such structures may exist within the "driver_ops" of the parent driver, implementing several bus classes. The structure being aimed at by "bus_ops" corresponds to the "bus_class" specified by the driver registry entry of the current driver. "bus_id" is an opaque for the current driver. It must be passed back to the parent bus driver, e.g. when the "open" bus service routine is invoked.

This invention uses mechanisms implemented in order to support the dynamic loading/unloading of a driver component, the dynamic discovering/enumeration of devices residing on a bus, the dynamic initialization/shut-down of a driver instance. These issues concern bus/nexus as well as device drivers.

The way the computer starts operation will now be considered.

It should be reminded that the device tree structure is accessed in the DKI thread context only, to ensure access synchronization. In many cases, driver routines which typically examine/modify the device tree are already invoked by the DKI thread. For instance, the driver probing, initialization and shut-down code is executed by the DKI thread. In a case when a driver needs to access the device tree at run time, a driver routine which uses the device tree API must be explicitly called in the DKI thread context. The same rule is applied to the driver clients: a driver client must always switch to the DKI thread context when needing to access the device tree structure.

The device tree data structure may be built either statically or dynamically:

in the static case, the device tree is populated by the OS booter. For instance, the OS booter may include a pre-defined sequence of device tree function calls. Another possibility for the OS booter is to build the device tree from a hardware description provided by firmware.

in the dynamic case, the device tree is populated at system initialization time using an enumeration/probing mechanism. The device tree is populated by propagating from parent to children.

It is possible to combine both methods: for example, an initial (non complete) device tree may be provided by the OS booter, and will later be completed dynamically using an enumeration/probing mechanism. The device tree structure may also be modified (extended/truncated) dynamically at runtime, because of the hot-plug insertion and/or removal (e.g. PCMCIA cards).

The following is a typical computer starting sequence (as far as devices and drivers are concerned).

Figure 7:
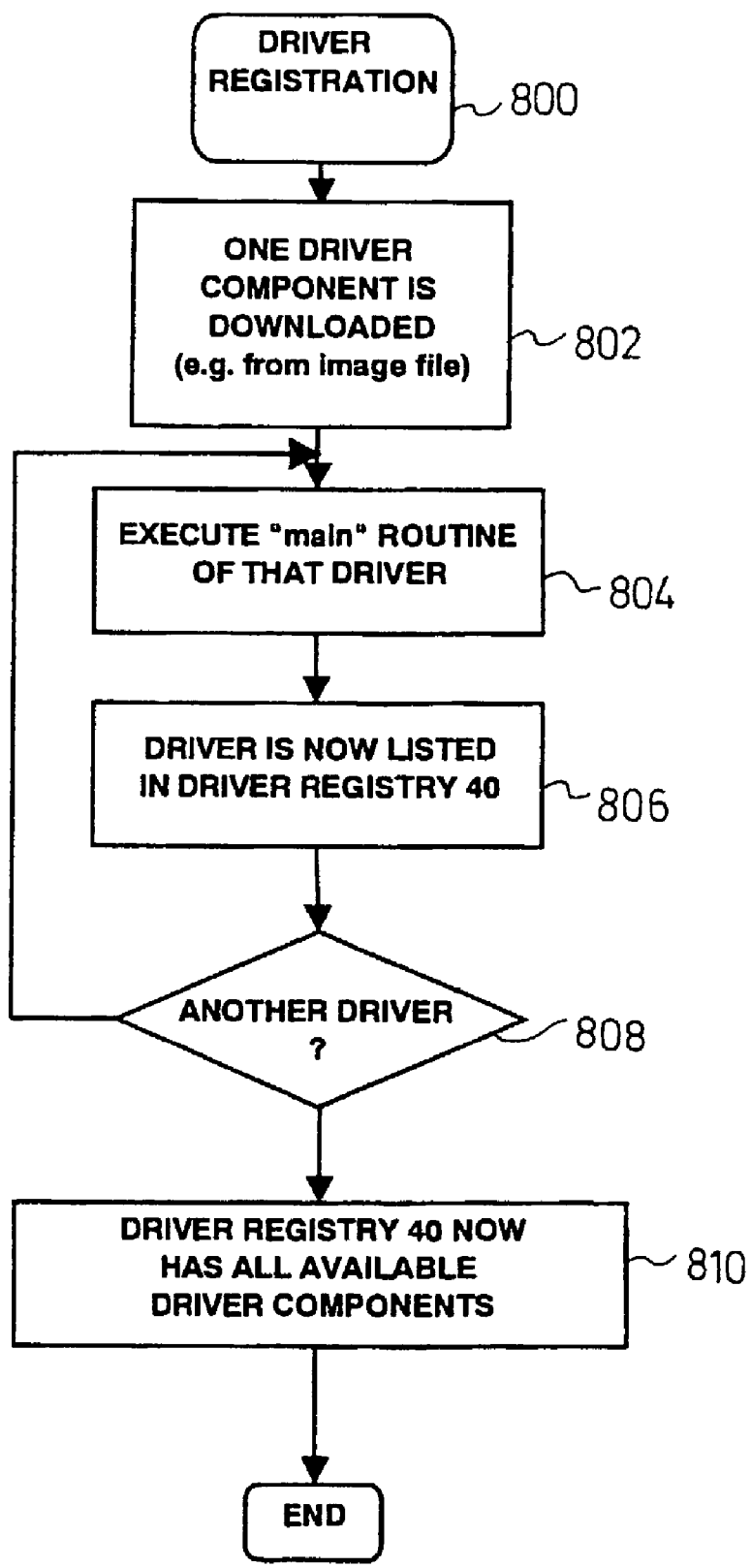
FIG. 7 is a flowchart illustrating a driver registration.

The first phase is the driver registration time (800, FIG. 7), initiated by the OS nucleus. At step 802, a driver component is downloaded in some way: it may be built-in to the OS bootable image, or it may be downloaded dynamically as a supervisor actor using e.g. the "afexec" system call of ChorusOS. At step 804, the system calls the "main" routine which performs the self-registration: it invokes the "svDriverRegister" microkernel call, passing as an argument a "DrvRegEntry" data structure which specifies the driver component properties. The driver is now added in driver registry 40 at step 806. Its DrvRegEntry structure is now accessible to the OS nucleus, e.g. through a pointer. Steps 804 and 808 continue until all downloaded drivers appear in driver registry 40 (step 810).

After the driver components have self-registered, the future driver management is mostly driven by the parent bus/nexus driver of each driver component, using the properties specified in the "DrvRegEntry" structure of that driver.

The second phase may be called "enumeration/probing". At that time, the OS nucleus starts execution of an iterative and/or recursive process, using the device tree, the device registry, the driver registry and certain of the driver operations. In the exemplary embodiment, this process forms a cascade of internested processes of "bus/nexus driver initialization".

Generally, an elementary phase of the process is as follows:

s0. a bus-nexus driver, bound to its device, is considered,
s1. the bus-nexus driver is initialized as a driver (like a leaf driver is initialized),
s2. in the case of a bus-nexus driver, the driver initialization additionally comprises (normally):
  s21. a "probing" step for finding child devices of the current bus-nexus driver,
  s22. a "binding" step for matching such child devices with corresponding drivers, and
  s23. an "init" step for initializing the driver/device pairs, by creating driver instances as necessary.

The iteration is due to the fact that, whenever step s23 initializes a bus nexus driver, a nested similar process is initiated, starting again at step s0, as it will be seen.

It should be reminded that, in FIG. 6, the root node 550 is the DKI services, which is part of the nucleus. Initiation of the second phase begins with a "bus/nexus driver initialization", applied to the (driver) root, whose parent is the DKI thread. In the example, the driver root is the PCI Bus Bridge driver 218. The corresponding node in the device tree is the PCI bus node. The required condition and resources for the PCI bus to operate are supposed to be prepared by the nucleus.

Figure 8:
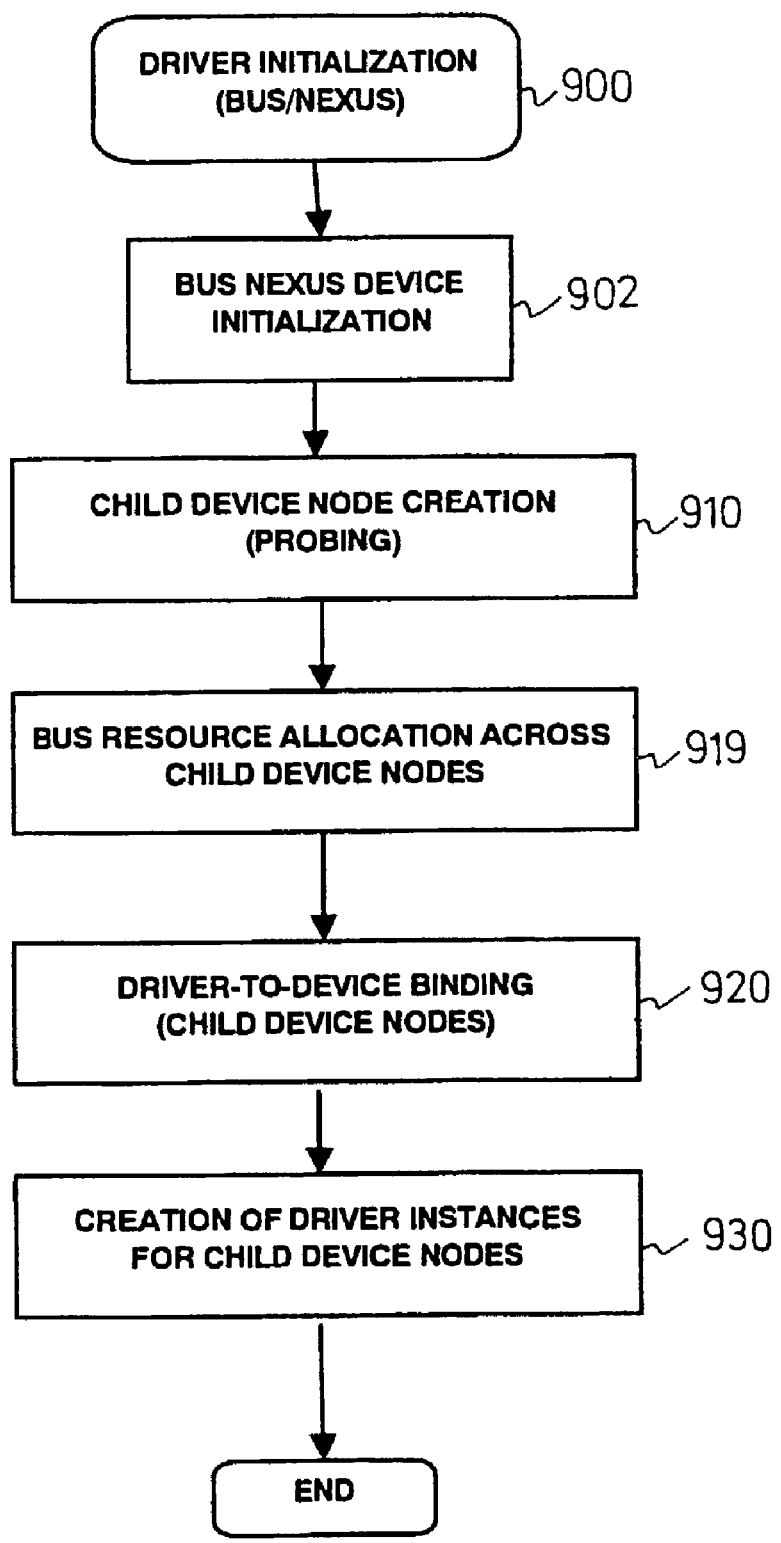
FIG. 8 is a flowchart illustrating the main steps of bus driver initialization.

The "bus/nexus driver initialization" will now be described in general, i.e. whatever the bus nexus is. FIG. 8 shows the main steps of such a Bus Driver Initialization Routine 900 (or "BDIR").

The first step 902 of the initialization of a given bus/nexus driver is similar to the leaf device driver initialization process of FIG. 12, and will be described in connection therewith. At this point, it is assumed that, after step 902, the given bus/nexus driver is able to access its hardware (e.g. internal bus bridge registers), that it has established connection to its parent bus/nexus driver, that it can use services implemented by its parent driver. (Initially, for the root driver, here the PCI bus, this has been done by the nucleus).

Then comes step 910 of "probing", which may result into the creation of child device nodes in the device tree. This will be described in more detail with reference to FIG. 9.

Figure 9:
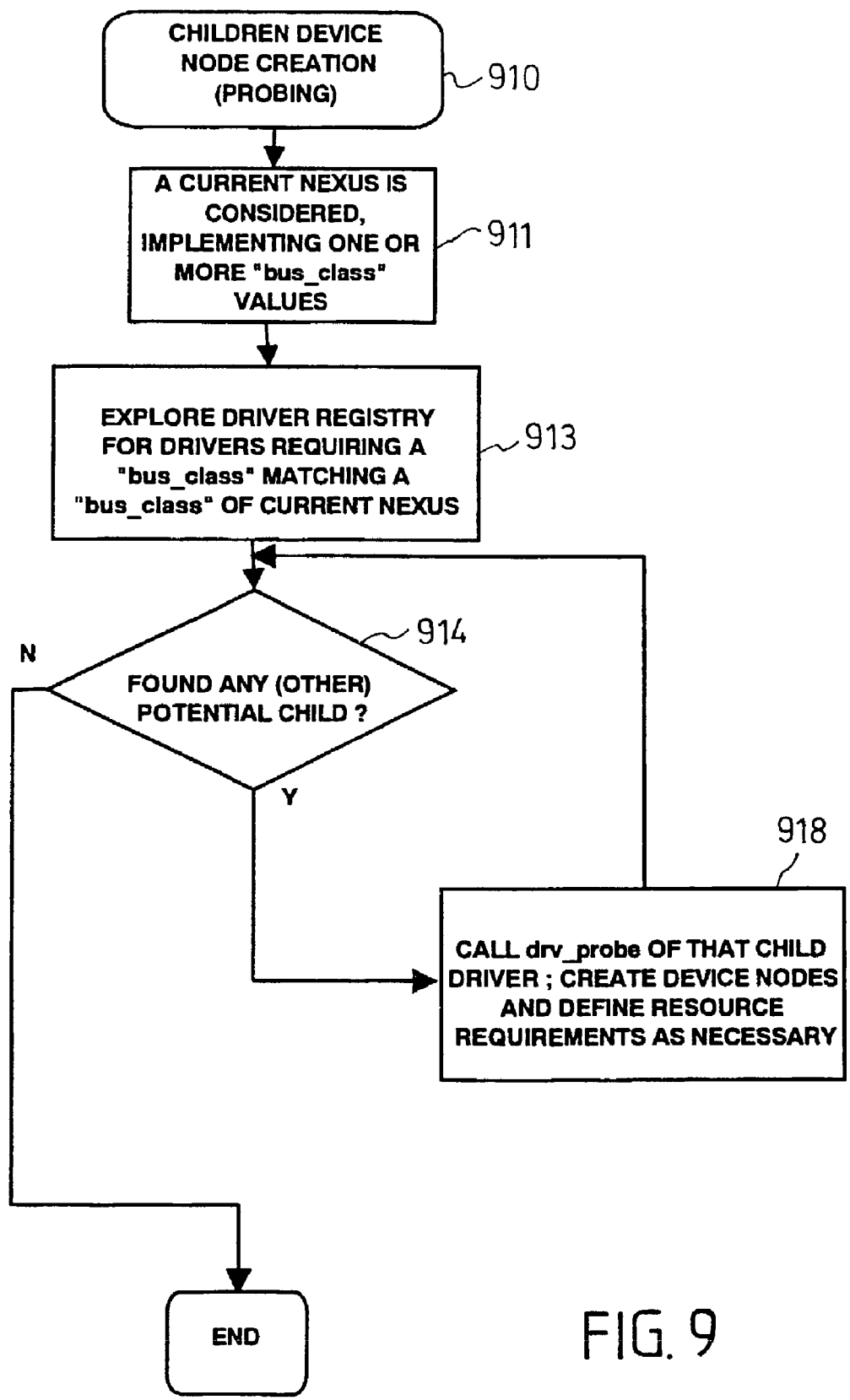
FIG. 9 is a flowchart illustrating step 910 of FIG. 8 in more detail.

Step 919 deals with allocating resources to the newly entered devices at step 910, as defined in step 918 of FIG. 9 (to be described). Each device node specifies bus resource properties required for the associated device: some of the required bus resources may be hardwired (e.g. fixed IRQ); other required bus resources may be configurable, and subject to some constraints (e.g. device address decoder constraints). At step 919, the bus/nexus driver iterates through existing child nodes in order to allocate configurable resources (taking the constraints into account) and to check possible resource conflicts. If a resource conflict is detected, the bus/nexus driver behaviour is implementation specific. The bus/nexus driver should never activate any driver on a node for which bus resources are not allocated successfully.

Then, step 920 performs a driver-to-device binding, which will be described with reference to FIG. 10. Finally, at step 930, driver instances are created in the child device nodes. This will be described with reference to FIG. 11.

FIG. 9 illustrates the probing step 910 in more detail. A "current" bus/nexus driver (911) searches in the driver registry data base for all drivers satisfying the following condition: the parent device class specified in the driver being searched must match the class of "current" bus/nexus, or one of its classes (913). The drivers being found (914) will form the first level of children of the "current" bus/nexus driver (the one considered in 911). For each such driver (implementing the "drv_probe" entry point), step 918 immediately executes another "drv_probe".

The pseudocode given in Exhibit A.7 and commented in Exhibit B.7 illustrates a typical probing loop in a bus/nexus driver, creating device nodes as required. "drv_probe" is called with three arguments: "dev_node", specifying the parent device node and a "bus_ops" and "bus_id" pair specifying the parent device driver. The "drv_probe" routine is optional. If it is absent, the "drv_probe" field in "DrvRegEntry" is set to NULL.

In general, the operation of a probe routine may be summarized as follows:
  The probe routine should avoid creating redundant nodes.
  The probe routine specifies the following device node properties,
    a physical device ID, enabling the bus driver to find the appropriate device driver for this device node. Preferably, the device ID is bus class specific. For instance, on PCI bus, the device ID is the vendor/device IDs pair.
    resource requirements, so that the bus driver can reserve resources required to initialize the device.

The probe routines will now be considered in more detail. In fact, there are two kinds of probe routines:
  generic (i.e. bus class specific only), like a self-identifying bus (e.g. PCI) enumerator;
  device specific (i.e. bus class and device specific), like a device probing code on an ISA bus.

Accordingly, child driver offering multiple probe routines for a given parent bus may be found in the driver registry. They may be processed in any desired order.

In addition, the probe routines may be invoked at run time when, for example, a device insertion is detected on the bus. In the latter case, the probe routines must be extremely careful about active device nodes, i.e. existing device nodes for which the device drivers have been already started and may be already in use.

The following rules are preferably respected by generic and device specific probe routines:
  The generic and specific probe routines may access the device hardware only through the bus service routines. The bus resources needed to access the device hardware (e.g. I/O registers) may be allocated through the bus service routines ("resource alloc"). This prevents the probe routine to access hardware which is currently in use. Upon unsuccessful probing, the used hardware resources is released through the bus service routines ("resource free").
  No probe routine (whether generic or device specific) may delete an active device node, or modify its properties (An active device node is a node for which a device driver is already running; such nodes are flagged with the "active" property).
  Device specific probe routines have higher priority than generic ones, i.e. device specific probe routines are allowed to override properties in an existing node or to delete an existing node, when inactive, while generic probe routines are not.
  No probe routine may create redundant nodes. When a probe routine is to create a device node, then it verifies that no other node exist for this device. Probing is normally avoided if the probing routine may create redundant nodes.

Implementing such probing mechanisms within a driver is considered accessible to men skilled in the art.

Figure 10:
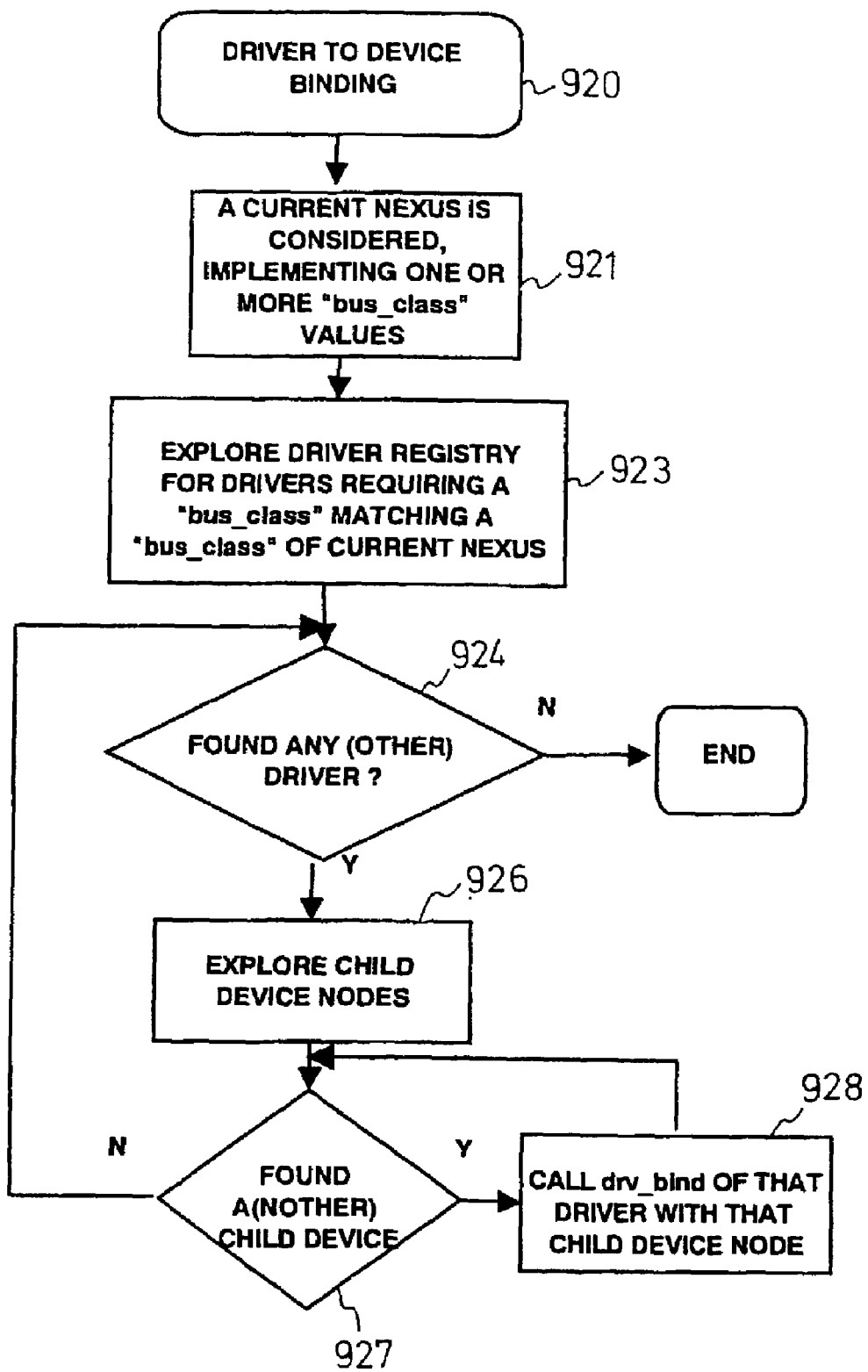
FIG. 10 is a flowchart illustrating step 920 of FIG. 8 in more detail.

A preferred implementation of the device-to-driver binding step 920 is shown in more detail on FIG. 10.

A "current" bus/nexus driver (921) searches in the driver registry data base for all drivers satisfying the following condition (923): the parent device class specified in the driver being searched must match the class of "current" bus/nexus, or one of its classes (and implement the "drv_bind" entry point). Each of the drivers being found (924) may now be bound to known device child nodes, found by the probing, and appearing in the device tree. Steps 926 and 927 scan through these child device nodes, and, in each, the "drv_bind" routine is invoked at step 928. When all children for all matching drivers have been seen, step 924 goes to the end.

The pseudocode given in Exhibit A.8 and commented in Exhibit B.8 illustrates a typical binding loop in a bus/nexus driver.

The driver-to-device binding mechanism may have various implementations:
  a very simple bind routine may be implemented by the child device driver itself. Such an implementation is device specific, and applies only to devices known by the driver as compatible with a reference device for which the driver is written.
  on the other hand, the system may need to support after-market hot-plug devices, and consult some network look-up service to locate the driver for a new device. In such a case, it may be preferable to use a generic separate binder driver, dedicated to implementing a smart driver-to-device mapping and a driver component downloading (without the probe and init routines). Of course, such a (generic) binder will be treated like the other driver components.

Figure 11:
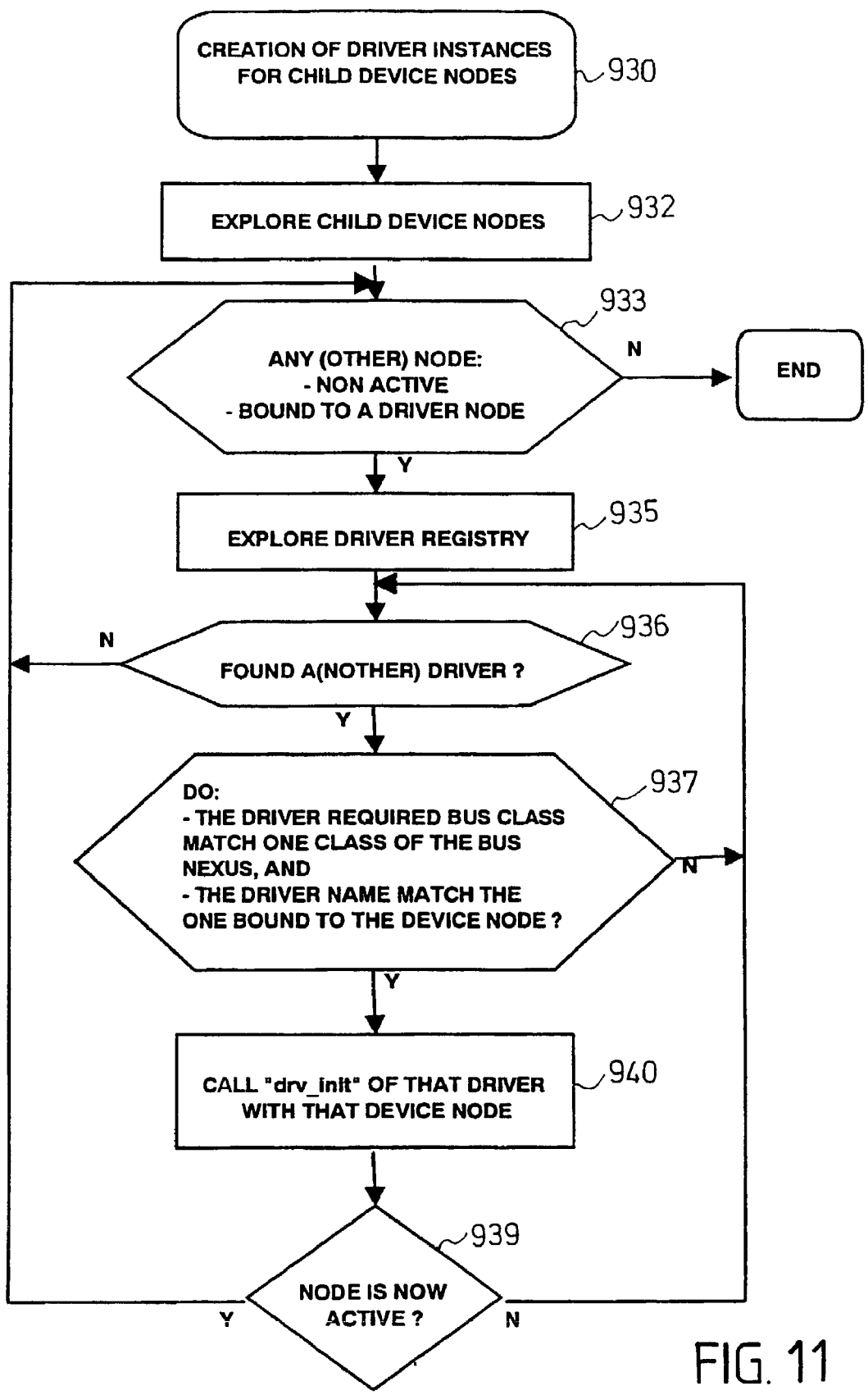
FIG. 11 is a flowchart illustrating step 930 of FIG. 8 in more detail.

A preferred implementation of step 930 is shown in more detail on FIG. 11.

At step 932, each bus/nexus driver explores its child device nodes in the device tree. It tests whether any of these devices is bound to a driver, but not active (933). This means that the driver has not yet been initialized, and should be started and instantiated for that device. Then, in the described embodiment, a complete checking is again performed: for any device verifying the condition, the driver registry is again explored (935); if a driver (or a further one) is found at step 936, then step 937 checks whether a) the required bus class of that found driver matches one class of the bus/nexus, and b) the driver name matches the one bound to the device node being considered. If so, step 940 calls the "drv_init" routine of that driver. The "drv_init" is called with three arguments. The "dev_node" argument specifies the device node for which a device driver instance should be created. If the drv_init succeeds in activating the device, test 939 returns to 933. Otherwise, or if step 937 indicated misfit, control is returned to step 936. If no adequate driver is found, test 936 returns control to step 933, for processing another child device, if any.

The above described complete checking is of interest because the same routine may be used for "hot" device and driver management as well. When used at initialization only, the routine may be simplified.

Preferably, when a driver instance is activated by a bus/nexus driver, the child driver establishes a connection to its parent bus/nexus driver, while specifying a call-back event handler. The parent bus/nexus driver may use the call-back event handler mechanism e.g. to shut down the child driver instance later, if required.

Step 940 will now be described in further detail.

Figure 12:
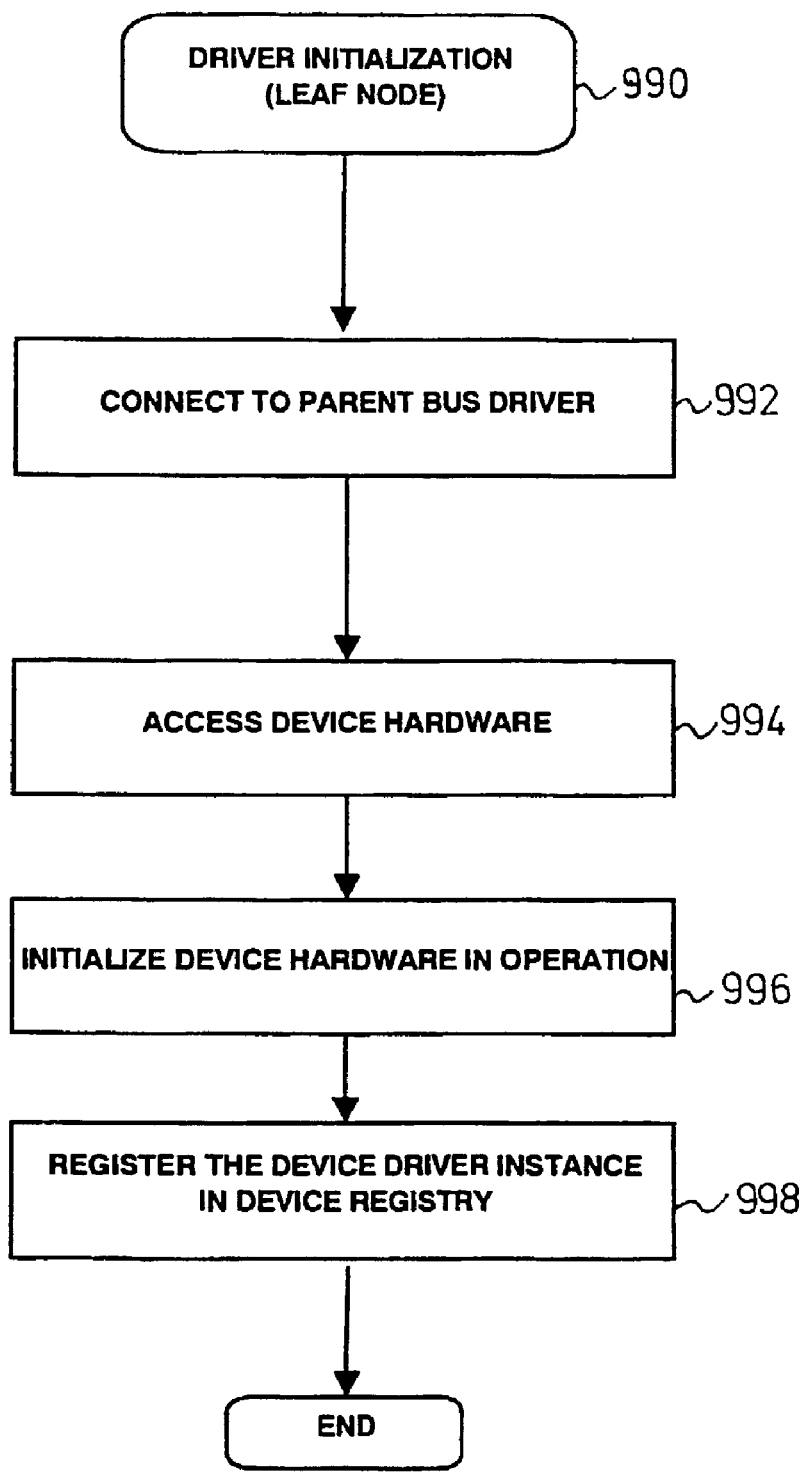
FIG. 12 is a flowchart illustrating the steps of leaf driver initialization.

If the child is a leaf child node, the process to be described with reference to FIG. 12 is executed, and control is given to step 939 of FIG. 11.

If, by contrast, the child is a bus-nexus, the process of FIG. 8 is resumed with the child. This means that a new BDIR (bus driver initialization routine) is recursively called, to be nested within the current one. The status of the current BDIR is stored before initiating the new one. This new BDIR may in turn result into a further BDIR, and so on, until reaching a "leaf-only" BDIR, where the child level includes leaf nodes only. When such a leaf-only BDIR terminates, by the "N" output of step 933, control is returned to the immediately preceding BDIR, until it terminates in turn. This is repeated until the initial BDIR terminates, indicating the whole device tree has been scanned.

The pseudocode given in Exhibit A.9 and described in Exhibit B.9 illustrates a typical initialization loop in a bus/nexus driver.

The purpose of "drv_init" is to create an instance of driver servicing the given device, to perform a device hardware initialization and to register the driver instance in the device registry (in the example, for leaf only). Typically, "drv_init" would read the device and bus node properties in order to obtain the assigned bus resources and tunable parameters related to the bus/device.

The "drv_init" routine is optional. In its absence, the "drv_init" field is set to NULL. A typical example of a probe-only driver is a self-identifying bus enumerator (e.g. PCI enumerator) which is implemented as a driver. Such a driver has the "drv_probe" routine which enumerates devices residing on the bus and creates device nodes, but needs no "drv_init" routine.

The initialization process of a device will now be considered in more detail. FIG. 12 shows the main steps of the initialization process "drv_init" of a leaf device driver (990).

At step 992, the driver establishes connection to the parent bus driver calling its "open" function. In calling "open", the child driver specifies call-back handlers, which will be used by the parent driver to manage the device instance driver (e.g. to shut down the driver instance). Similarly, global bus events (e.g. a catastrophic bus error) are delivered to the driver through a call-back handler.

Once the child-to-parent connection is established, the driver may use services provided by the parent driver. At step 994, the child driver asks its parent driver to make available the bus hardware resources needed for its bound device. In fact, the bus resources needed for the device have been specified as properties in the device node, and such resources have been already allocated by the parent bus/nexus driver prior to the "drv_init" invocation. Thus, "making available" a given bus resource (e.g. device I/O registers), means that the driver obtains an appropriate property value and calls an appropriate bus/nexus service routine.

Then, at step 996, the child driver initializes the device hardware to an operational state. Finally, at step 998, the (leaf) driver performs the self-registration in the device registry. This declares that a new device, together with its device driver instance, is available in the system.

Once the device (i.e. the device driver instance) is registered, a driver client may find such a device in the registry (using the device registry API) and may perform operations on the device, calling driver service routines exported through the device registry entry. The driver is not obligated to register any device driver instances and offer any device service routines through the device registry. The device driver instance registration is only required for clients who plan on finding their devices through the device registry. If other client-to-driver binding mechanisms are in use, the associated devices need not take part in the device registry.

The (leaf) "drv_init" routine is called in the context of DKI thread. It makes possible to invoke directly the bus/nexus and DKI services allowed in the DKI thread context only.

Step 902 of FIG. 8 may now be described in detail. Like a leaf driver, initialization of a bus/nexus driver comprises enabling it to access its hardware (e.g. internal bus bridge registers), to establish connection with its parent bus/nexus driver and to use services implemented by its parent driver.

So, step 902 might include all steps 990–998 of FIG. 11. However, in the preferred embodiment, when initializing a bus/nexus driver, step 998 is omitted, i.e. the nexus driver does not implement registering its bus/nexus instance and the corresponding device in device registry 50. Thus, upon a call in operation from a driver client 250:

the client to (leaf) driver binding, aiming at a leaf node, uses the device registry;

then a binding mechanism (child to parent) is necessary to enable travelling within the tree from the leaf towards the root; rather than a child-to-parent driver binding mechanism, a parent to child action is used instead: each parent bus/nexus driver provides its child with a pointer to its service routines vector and its identifier, for use in operation (and also e.g. when the "drv_probe" or "drv_init" routine of the child driver will be invoked). This does not use the device registry.

In summary, when starting the computer, a full device and driver scanning may be performed as follows. A first "Bus Driver Initialization routine" or BDIR is launched, with the "current bus/nexus node" being the (driver) root, i.e. the pci bus in the example. Loops perform a) probing, b) binding, c) creation of driver instances (as appropriate in each case). This builds the child level of the current bus/nexus node. Whenever the child level comprises another bus/nexus node, phase c) launches a nested recursive call of the BDIR, with that bus/nexus node as a "current bus/nexus node".

Thus, considering a given nexus (sub)node:

the child node level in the device tree is constructed by a single probing step;

for the subsequent driver initialization, the subtree of the given (sub)node is explored following a branch, until a leaf-only level is found, then going back to the last nexus to follow another branch, and so on until the whole subtree has been seen.

Although the above described ways of scanning the device tree for i) probing, ii) binding, and iii) initializing drivers recursively are preferred, other scanning methods may be contemplated by men skilled in the art, using the same principles.

Modification of the device and driver framework in operation will now be considered. The change may be due to two different events:

the system sees a new driver (load handler), a device is added/removed (hot plug).

A given nexus device driver has a handler named "Driver Load Handler", which is invoked by the parent bus/nexus driver, when a new driver appears in the system in operation: for example, a new driver is downloaded at run time, and has just registered in the driver registry 40, using its "main" routine. The load handler address is given to the "given" bus/nexus driver when a connection is established between the new child driver and the parent bus/nexus driver.

The load handler is optional. Normally, a leaf device driver is not interested about such an event. The load handler is usually used by a bus/nexus driver (e.g. bus-to-bus bridge), which is interested in applying a newly downloaded driver to its child devices which are not serviced yet.

Figure 13:
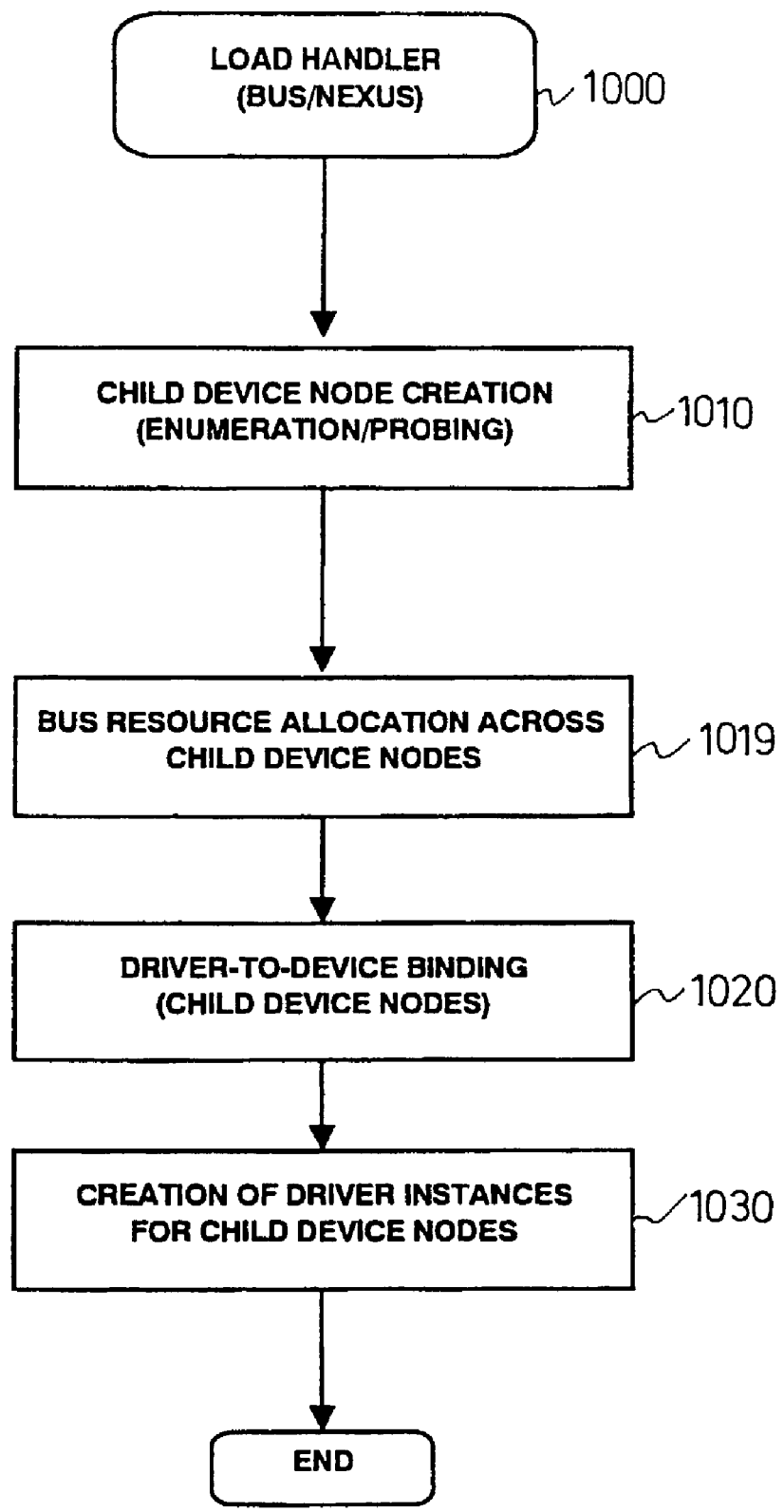
FIG. 13 is a flowchart illustrating the steps of processing a load handler.

FIG. 13 shows the actions 1010–1030 taken by the load handler. They are similar to steps 910–930 shown in FIG. 8 for the bus/nexus driver initialization. The process normally starts again from the root node, i.e. the pci bus in the example. Step 902 is omitted, since the bus/nexus device is already initialized.

At step 1010, the bus/nexus driver invokes the probe routines registered in the driver registry matching the bus/nexus class. The probing loop of Exhibit A.7 is used again. The probe routines already invoked at initialization time will likely be invoked again. As mentioned, a probe routine must be aware about existing device nodes in order to avoid creation of redundant device nodes. In addition, a probe routine must explicitly ask for bus resources in order to avoid conflicts with bus resources currently in use. In this way, the active device nodes and associated running driver instances are protected against a perturbation caused by the run-time probing.

Thus, the probe routine implemented by the newly downloaded driver will likely discover one or more device(s) previously unknown in the system, with one or more corresponding new child device nodes being created. If so, at step 1019, the bus/nexus driver will check/allocate bus resources required for such new device nodes.

Step 1019 is more sophisticated than corresponding step 919 of FIG. 8. In order to satisfy such a run-time resources request, the bus/nexus driver may need to confiscate resources already assigned to existing ("older") device nodes; however, in so doing, the bus/nexus driver is not allowed to confiscate resources in use, i.e. resources assigned to active "older" device nodes. The driver instance associated with such an active "older" node must be shut down by the bus/nexus driver prior to any resource confiscation. In order to shut down an "older" driver instance, the bus/nexus driver sends a shut down event to the "older" child driver, requesting to close the "older"-child-to-parent driver connection, i.e. to invoke "close". Once the connection is closed, the "older" device node becomes inactive and the bus/nexus driver is able to confiscate bus resources assigned to that "older" node. In such a case, the bus/nexus driver should start the "older" driver instance again, invoking the driver "drv_init" routine, to have the driver operate when its resource requirements may be satisfied.

Once the bus resources allocation is done, the bus/nexus driver iterates through the child nodes and, for each inactive device node, it tries to determine a driver component which should be applied to the given device, and does the binding at step 1020, which is the same as step 920. Once such a driver component is found, the bus/nexus driver calls the driver "drv_init" routine, at step 1030, which is the same as step 930.

Finally, the bus/nexus driver invokes the child load handlers (if any) in order to propagate the loading process downstream (i.e. from parent to child). In such a way, the loading process is recursively continued by the child driver load handler(s).

The load handler is called in the context of DKI thread. It makes it possible to invoke directly the bus/nexus and DKI services allowed in the DKI thread context only.

The case of hot-pluggable device drivers will now be considered. In case of hot-plug, the initialization/shutdown process has to be executed at runtime, rather than as part of the kernel/drivers initialization process. In such a case, drivers should use DKI thread services to explicitly synchronize with already running drivers.

The hot-plug insertion event is typically reported via interrupt. In order to be notified when the hot-plug insertion occurs, the bus driver connects an interrupt handler to an appropriate interrupt source.

Thus, the bus driver typically detects the insertion event at interrupt level. In order to process such an event, the bus driver invokes "svDkiThreadTrigger" requesting the DKI thread to execute a bus driver routine which implements the hot-plug insertion procedure. The DKI thread serializes all actions related to the initialization and termination. In addition, it allows the insertion procedure to invoke directly the parent bus/nexus and DKI services allowed in the DKI thread context only.

The hot-plug insertion processing again goes through main steps similar to steps 1010–1030 of FIG. 13, i.e.:

discover a new device inserted to the bus and create the device node associated with this device, allocate bus resources for the new node, bind a driver to the new node, create a driver instance associated with the new node.

Actions taken by the hot-plug insertion are very close to the actions taken by the load handler, because once a new child node appears, the bus driver behaviour is always the same. It tries to allocate bus resources required for this node and it tries to apply a driver to this node. It does not matter why a new device node has appeared (In case of load handler, a new device may appear because of a new probe routine having been running).

The driver event handler is invoked by the parent bus/nexus driver when a bus/nexus event occurs. The event handler address is given to the bus/nexus driver when a connection is established between the child driver and its parent bus/nexus driver. The event handler may be called as an interrupt handler and therefore the event handler implementation must be restricted to the API allowed at interrupt level.

Among all events which are mostly bus/nexus class specific, there are three shut down related events (specified by the common bus API) which are discussed in this section:

[xxx_]SYS_SHUTDOWN—system (emergency) shut down. The prefix "xxx" may mean "DKI", "BUS", etc., to the extent the event semantics are the same for all such events. The SYS_SHUTDOWN event notifies the driver instance that the system is going to be shut down. The parent bus/nexus driver requires the child driver instance to perform an emergency shut down of the device hardware.

DEV_SHUTDOWN—normal device shut down. The DEV_SHUTDOWN event notifies the driver instance that a normal device shut down is requested by the bus/nexus driver.

DEV_REMOVAL—surprise device removal. The DEV_REMOVAL event notifies the driver instance that the associated device has been removed from the bus/nexus and therefore the driver instance has to be shut down.

In the general case, the shut down event processing goes through three phases: shut down prologue, shut down mode, shut down epilogue.

The first phase (called shut down prolog) is processed synchronously within the event handler. The main purpose of the shut down prolog is to notify driver clients (or child drivers) that the shut down event has occurred, in other words, to propagate the shut down prolog downstream (i.e. from parent to child). After the shut down event has been processed by driver clients (or child drivers), the driver enters in the third shut down phase (called shut down epilogue). Basically, the shut down epilogue is invoked when the last reference on the driver instance goes away. Between the shut down prolog and epilogue, the driver operates in a special mode (called shut down mode). In such a mode, the driver accepts only a subset of operations from clients allowing to properly close connections to the driver.

Table T5 in FIG. 18 shows typical actions taken by the shut down prolog depending on the event type. Note that the notification mechanism used by the shut down prolog depends on driver type and it is different for the bus/nexus and leaf (device) drivers. The shut down prolog of the bus/nexus driver notifies the child drivers calling the child driver event handlers. The shut down prolog of the leaf (device) driver notifies driver clients calling the "svDeviceEvent" routine.

The SYS_SHUTDOWN prolog of a bus/nexus driver invokes the event handlers of child drivers connected to it. Once the invocation is done, the bus/nexus driver puts the hardware into a clean state. The SYS_SHUTDOWN prolog of a leaf (device) driver does not notify driver clients about the system shut down event. The driver just puts the hardware into a clean state. In fact, the SYS_SHUTDOWN event is processed synchronously, i.e. within the event handler (In other words, the system shut down epilogue is empty). The only purpose of the "SYS_SHUTDOWN" event is to put the board hardware into a clean state in order to properly perform the system reboot (or restart).

The "DEV_SHUTDOWN" prolog only notifies driver clients (or child drivers) that the "DEV_SHUTDOWN" event has occurred. The real device shut down is deferred up to the "DEV_SHUTDOWN" epilogue. The "DEV_REMOVAL" prolog does the same as the "DEV_SHUTDOWN" one, and, in addition, aborts all I/O operations in progress because, otherwise, such operations will never be completed. Aborted operations will return to callers with an error code.

As soon as the shut down prolog is processed, the driver changes its internal state: it enters a shut down mode, in which it accepts only a subset of operations from clients. Basically, the driver accepts requests to abort queued operations, to release previously allocated resources, and to close connection to the driver. All other operations (like open a new connection, start an I/O operation) are refused by the driver. In other words, in the shut down mode, the driver is waiting until a shut down epilogue condition is met, allowing clients to properly close existing connections to the driver.

The "shut down" epilogue condition is met within a bus/nexus driver, when the last connection is closed to the driver instance. The shut down epilogue condition is met within a leaf (device) driver, when the device entry is released by the last driver client, i.e. when the call-back release handler is invoked by the device registry. Note that, typically, the shut down epilogue condition is met when the driver is running in the DKI thread context. Indeed, the "close" service routine and call-back release handler are both called in the DKI thread context. Thus, in natural way, the shut down epilogue is processed in the DKI thread context. It makes possible to invoke directly the bus/nexus and DKI services allowed in the DKI thread context only.

Table T6 in FIG. 19 shows typical actions taken by the shut down epilogue depending on the event type. The "DEV_SHUTDOWN" epilogue puts hardware into a clean state, releases system resources used by the driver instance and, finally, closes connection to the parent driver ("close"). The "DEV_REMOVAL" epilogue is close to the "DEV_SHUTDOWN" one except the device hardware is not touched by the driver, because (obviously) the device hardware is no more present on the parent bus.

When a shut down epilogue closes the last connection to the parent driver, the shut down epilogue condition would be met in the parent driver too. Then, the shut down epilogue is propagated upstream (i.e. from child to parent). If one of driver clients (or one of child drivers) does not implement properly the shut down procedure (e.g. simply does not support the shut down), the driver may stay in the shut down mode, while never meeting the shut down epilogue condition.

The Hot-plug Removal will now be described.

The hot-plug removal event is typically reported via interrupt. In order to be notified when the hot-plug removal occurs, the bus driver connects an interrupt handler to an appropriate interrupt source. Hot-plug removal may include:

"surprise removal", i.e. a device can be removed at any time with no warning. For instance, PCMCIA is a surprise removal device.

"non-surprise removal", i.e. the device cannot be removed until the system is prepared for it. For instance, Hot-Plug CompactPCI is a non-surprise removal device.

The surprise removal interrupt notifies the bus driver that a device has been removed from the bus. The bus driver interrupt handler usually detects the removed device (and associated device node) using bus specific status register(s). Once the device is detected, the interrupt handler checks whether the device node is active.

If the device node is inactive (i.e. there is no driver instance servicing this device), the only task of the bus driver is to update the device tree removing the device node. All bus resources associated with the node becomes free. The bus driver is not able to accomplish this task immediately at interrupt level because the necessary services can be called in the DKI thread context only, and are not available at interrupt level. In order to satisfy the invocation context requirements, the bus driver calls "svDkiThreadTrigger" requesting the DKI thread to invoke the removal procedure. Another reason to use the DKI thread is to serialize all actions related to the initialization and termination.

If the device node is active, the bus driver must shut down the corresponding device driver instance prior to invoke the removal procedure. In order to accomplish this task, the bus driver invokes the device driver event handler, signalling the "DEV_REMOVAL" event. In fact, the bus driver performs the shut down prolog for the given driver instance. In other words, the bus driver initiates the shut down process for the device sub-tree starting from the removed device node.

As the last action of the shut down event processing, the device driver will close the connection to the bus driver and, at this moment, the bus driver will perform the removal procedure. The device node removal procedure is executed in the DKI thread context because the "close" service routine is called in the DKI thread context.

The "non-surprise removal" interrupt requests the bus driver to enable the device removal from the bus. The processing is the same as for "Surprise Removal", except the bus driver requests the normal device shut down (DEV_SHUTDOWN) rather than the device removal one (DEV_REMOVAL). In addition, once the device tree is updated, the bus driver enables the device removal. (The device removal enabling is usually signalled by a LED or/and by a card ejection mechanism un-locking).

Unloading a driver will now be discussed. The only means to unload a driver is a "Driver Unload Routine" or "drv_unload". The "drv_unload" is a global per driver component routine. Therefore, in order to implement unloading, the driver should handle a list of its driver instances.

The "drv_unload" routine is optional. In case when "drv_unload" is not provided by a driver, its "drv_unload" field is set to NULL, and the driver code cannot be unloaded.

"drv_unload" is called by the "svDriverUnregister" routine of the driver registry module, when an application wishes to unload the driver component from the system. The purpose of "drv_unload" is to check that the driver component is not currently in use: e.g. the driver must check for each driver instance whether it is locked in the device registry.

On success, all device instances are removed from the device registry and "drv_unload" returns "K_OK". Otherwise "K_EBUSY" is returned, the driver component will not be unloaded, its state is not changed, all registered driver instances remain in place, and the device entries are unchanged in the device registry.

Since the "drv_unload" routine is called in the context of DKI thread, it can invoke directly the bus/nexus and DKI services allowed in the DKI thread context only.

When "drv_unload" is called, the driver should go through the list of driver instances, and check whether any of them is currently in use. If a given instance is not used, the driver instance become invisible for potential clients. Thus, if "drv_unload" returns "K_OK", all previously created driver instances (if any) are deleted and all previously allocated system resources (if any) are released.

The driver unloading implementation is different for a bus/nexus driver, using the standard child-to-parent driver binding mechanism, and a leaf device driver, using the client-to-driver binding mechanism based on the device registry. (If another client-to-driver binding mechanism is used, the driver unloading implementation is binding mechanism dependent).

The "drv_unload" routine in a Bus/nexus Driver typically takes the following actions:
  step 1: check that the driver component is not in use. "drv_unload" iterates through the driver instances list and, for each driver instance, checks whether a connection is opened to the driver instance. Once a driver instance with an open connection is found, the iteration is aborted and "K_EBUSY" is returned. Otherwise, "drv_unload" proceeds to step 2.
  step 2: release resources associated with the driver component. "drv_unload" iterates through the driver instances list and, for each driver instance, releases all system resources associated with the instance and, finally, closes the connection to the parent bus. Once the iteration is finished, "drv_unload" returns "K_OK".

The fact that "drv_unload" is running in the DKI thread context guarantees stability of the driver instances and open connections during the "drv_unload" execution: a new driver instance may be created only by the "drv_init" routine and a new parent-to-child connection may be open only by the "drv_init" or "drv_probe" routines. Both "drv_init" and "drv_probe" are invoked in the DKI thread context. Thus, "drv_init" and "drv_probe" are serialized with "drv_unload" by the DKI thread. On the other hand, if a bus/nexus driver supports hot-pluggable devices, it is up to the bus/nexus driver to implement a synchronization mechanism with a hot-plug insertion interrupt which may occur during the driver unloading.

The "drv_unload" routine in a (leaf) device driver typically takes the following actions:
  step 1: check that the driver component is not in use. "drv_unload" iterates through the driver instances list and, for each driver instance, invokes "svDeviceUnregister" in order to remove the driver instance entry from the device registry. If "svDeviceUnregister" fails (i.e. returns "K_EBUSY"), the iteration is aborted and "drv_unload" proceeds to step 2. Otherwise (i.e. all device instances are successfully unregistered), "drv_unload" proceeds to step 3.
  step 2 (fail): "drv_unload" iterates through the driver instances list and, for each driver instance which has been unregistered at step 1, invokes "svDeviceRegister" in order to register the driver instance again. Once the iteration is finished, and the initial state of the driver component has been restored, "drv_unload" returns "K_EBUSY".
  step 3: "drv_unload" iterates through the driver instances list and, for each driver instance, releases system resources associated with the instance and, finally, closes the connection to the parent bus when all resources associated with the driver component have been released. Once the iteration is finished, "drv_unload" returns "K_OK".

It should be reminded that "drv_unload" is running in the DKI thread context. This guarantees stability of the driver instances during the "drv_unload" execution. Indeed, a new driver instance may be created only by the "drv_init" routine which is invoked in the DKI thread context too. Thus, "drv_init" is serialized with "drv_unload" by the DKI thread.

As already mentioned, in some cases, a driver may defer its device initialization, until it is opened. This is a way to resolve a conflict about usage of the same resource by multiple drivers. In that way, drivers sharing a resource can be loaded at same time, provided they are not opened at same time. In such a case, the initialization and shutdown process of the driver has to be executed at runtime, i.e. at time of driver "open" and "close", respectively, rather than as part of the kernel/drivers initialization process. Thus, deferred initialization drivers should also use the above described DKI thread services to explicitly synchronize with already running drivers.

On another hand, the relation between a bus driver and its child driver(s) may offer several possibilities.

A bus driver may provide multiple API's. A typical example is a PCI bus driver providing a common bus API and a PCI bus API. The PCI bus driver API is named "pci" and specified by a "PciBusOps" structure. The common bus driver API is named "bus" and specified by a "BusOps" structure, which provides a subset of services provided by "PciBusOps". Such a bus driver is able to support drivers which use either common ("bus") or PCI ("pci") parent bus interface. When the bus driver invokes a child driver, it gives a pointer to either the "BusOps" or the "PciBusOps" structure depending on "bus_class" specified in the child driver registry entry.

Conversely, a driver may be adaptive as to its parent bus API, i.e. be able to run on top of a number of different buses (e.g. "pci" and "is a"). Typically, such a driver is composed of two parts: bus class specific and bus class independent. The bus class specific part of the driver code mainly deals with the device probing and initialization. In addition, it provides an abstraction layer in order to hide the bus class dependencies from the bus class independent part of the driver code.

Such a multi-bus driver should be registered multiple times in the driver registry. Each entry specifies a given bus class API (via the "bus_class" field) on top of which the driver may run. In order to determine to which bus class the driver is applied, the "drv_probe", "drv_bind" and "drv_init" routines have to be entry specific (i.e. bus class API specific). Under such conditions, when a given driver's routine is invoked by a bus driver, the driver detects the bus class to which it is applied and casts the "bus_ops" argument to the appropriate structure (e.g. "PciBusOps").

In this invention, as it will be appreciated, each driver has driver management functions and driver/device service functions. In accordance with the device tree (and the corresponding virtual driver tree), the functions are closely related to the needs of the driver to device relation. This is advisable to avoid that shutdown of a driver instance be detrimental to operation of other <device/driver instance> pairs.

Thus, the described system provides:
  in operation, a simple tool for enabling driver client code to perform operations on a given device, using the device registry;
  a flexible and consistent way of initializing drivers and devices, when starting the computer;
  a flexible and consistent way of taking new drivers into account, as well as to unload drivers, in operation;
  a flexible and consistent way of managing device insertion and/or removal (and/or failure), in operation;
  a consistent way of managing resources shortage, when appropriate.

These features may be used in any desired combination. In such combinations, the features being useless may be omitted.

This invention is not restricted to the embodiment as disclosed. Although it extensively refers to ChorusOS, it may be applied to other operating systems as well. The organization of the probing, binding and initialization operations and loops may be different. The organization of data and code may also be different; this remark concerns the drivers and driver instances, the device registry, the driver registry, the device tree, and their relations. Also, despite the driver tree is described as virtual, it may also be given a data representation.

Exhibit A

A-1
typedef struct DevRegEntry {
char* dev_class; /* device class */
void* dev_ops; /* device driver service routines */
void* dev_id; /* device driver ID */
DevNode dev_node; /* device node */
} DevRegEntry;

A-2.1
void
svDkiThreadCall (DkiCallToken* token, DkiCallHandler handler,
void* cookie);

A-2.2
void
svDkiThreadTrigger (DkiCallToken* token, DkiCallHandler handler,
void* cookie);

A-3.1
DevNode
dtreeNodeRoot ( );
DevNode
dtreeNodeChild (DevNode node);
DevNode
dtreeNodePeer (DevNode node);
DevNode
dtreeNodeParent (DevNode node);

A-3.2
DevNode
dtreeNodeAlloc ( );
void
dtreeNodeFree (DevNode);
void
dtreeNodeAttach (DevNode pnode,DevNode cnode);
void
dtreeNodeDetach (DevNode node);

A-3.3
DevProperty
dtreePropFind (DevNode node, char* name);
DevProperty
dtreePropFindNext (DevProperty prop, char* name);
unsigned int
dtreePropLength (DevProperty prop);
void*
dtreePropValue (DevProperty prop);
char*
dtreePropName (DevProperty prop);
DevProperty
dtreePropAlloc (char* name)
int length);
void
dtreePropFree (DevProperty prop);
void
dtreePropAttach (DevNode node, DevProperty prop);
void
dtreePropDetach (DevProperty prop);

A-3.4
DevNode
dtreeNodeAdd (DevNode parent, char* name);
DevNode
dtreeNodeFind (DevNode parent, char* name);
Dev Property
dtreePropAdd (DevNode node,
char* name,
void* value,
unsigned int length);

A-4.1
svDeviceAlloc
typedef void (*DevRelHandler) (DevRegEntry*);
DevRegId
svDeviceAlloc (DevRegEntry* entry,
unsigned int version
Bool shared,
DevRelHandler handler);

A-4.2
svDeviceRegister
void
svDeviceRegister (DevRegId dev_id);

A-4.3
svDeviceUnregister
KnError
svDeviceUnregister (DevRegId dev_id);

A-4.4
svDeviceEvent
typedef enum {
DEV_EVENT_NULL=0, /* NULL (unused) event */
DEV_EVENT_SHUTDOWN, /* normal device shut down request */
DEV_EVENT_REMOVAL /* hot-plug device removal notification */
} DevEvent;
void
svDeviceEvent (DevRegId dev_id, DevEvent event, void* arg);

A-4.5
svDeviceFree
void
svDeviceFree (DevRegId dev_id);

A-4.6
svDeviceLookup
typedef void (*DevEventHandler) (void*, DevEvent, void*);
KnError
svDeviceLookup (char* dev_class,
unsigned int dev_version,
unsigned int dev_unit,
DevEventHandler cli_handler,
void* cli_cookie,
DevClientId* cli_id);

A-4.7
svDeviceEntry
DevRegEntry*
svDeviceEntry (DevClientId* cli_id);

A-4.8
svDeviceRelease
void
svDeviceRelease (DevClientId* cli_id);

A-5
typedef struct DrvRegEntry {
char* drv_name; /* driver name */
char* drv_info; /* driver info */
char* bus_class; /* class of the parent API (e.g. "pci") */
int bus_version; /* minimal version of the parent class API */
/*
* drv_probe( ) performs an enumeration/probing of
* device(s) residing on the parent bus. When such a device is found,
* the probe routine creates a new child device node (with respect to
* the parent "bus_node") in the device tree. The probe routine
* attaches device properties (including required resources)
* to the newly created device node.
*/
void
(*drv_probe) (DevNode bus_node,
void* bus_ops,
void* bus_handle);
/*
* drv_bind( ) performs a driver-to-device binding.
* It gives an opportunity to the driver to dynamically
* bind the driver to a given device. The device is specified
* by its device node in the device tree.
*/
void
(*drv_bind) (DevNode dev_node);
/*
* drv_init( ) creates an instance of driver for
* the given device. Device is specified by its device
* node in the device tree.
*/
void
(*drv_init) (DevNode dev_node,
void* bus_ops,
void* bus_handle);
/*
* drv_unload( ) notifies the driver that somebody wishes to
* unload the driver component from the system.
* The driver checks whether it is currently used by a driver client.
* The K_EBUSY return value means that the driver code is currently
* in use.
*/
KnError
(*drv_unload) ( )
} DrvRegEntry;

A-6.0
svDriverRegister
KnError
svDriverRegister (DrvRegEntry* drv_entry);

A-6.1
svDriverLookupFirst
DrvRegId
svDriverLookupFirst( );

A-6.2
svDriverLookupNext
DrvRegId
svDriverLookupNext (DrvRegId drv_id);

A-6.3
svDriverRelease
void
svDriverRelease (DrvRegId drv_id);

A-6.4
svDriverEntry
DrvRegEntry*
svDriverEntry (DrvRegId drv_id);

A-6.5
svDriverCap
KnCap*
svDriverCap (DrvRegId drv_id);

A-6.6
svDriverUnregister
KnError
svDriverUnregister (DrvRegId drv_id);

A.7
DrvRegId drv_curr;
drv_curr=svDriverLookupFirst( );
while (drv_curr) {
    DrvRegId drv_prev;
    DrvRegEntry* drv_entry;
    drv_entry=svDriverEntry(drv_curr);
    if (!strcmp(my_class, drv_entry->bus class) &&
    (my_version>=drv_entry->bus_version) &&

```
    drv_entry->drv_probe) {
      drv_entry->drv_probe(my_node, my_ops, my_id);
    }
    drv_prev=drv_curr;
    drv_curr=svDriverLookupNext(dry _prev);
    svDriverRelease(drv_prev);
}
A.8
DrvRegId drv_curr;
drv_curr=svDriverLookupFirst( );
while (drv_curr) {
  DrvRegId drv_prev;
  DrvRegEntry* entry;
  entry=svDriverEntry(drv_curr);
  if (entry->drv_bind && !strcmp(my_class, entry->bus_class) &&
    (my_version>=entry->bus_version)) {
    DevNode dev_node=dtreeNodeChild(my_node);
    while (dev_node) {
      entry->dev_bind(dev_node);
      dev_node=dtreeNodePeer(dev_node);
    }
  }
  drv_prev=drv_curr;
  drv_curr=svDriverLookupNext(drv_curr);
  svDriverRelease(drv_prev);
}
A.9
DevNode dev_node;
dev_node=dtreeNodeChild(my_node);
while (dev_node) {
  if (!dtreePropFind(dev_node, "active")) {
    DevProperty drv_prop;
    char* drv_name;
    DrvRegId drv_curr;
    drv_prop=dtreePropFind(dev_node, "driver");
    if (drv_prop) {
      drv_name=(char*) dtreePropValue(drv_prop);
      drv_curr=svDriverLookupFirst( );
      while (drv_curr) {
        DrvRegId drv_prev;
        DrvRegEntry* drv_entry;
        drv_entry=svDriverEntry(drv_curr);
        if (!strcmp(my_class, drv_entry->bus_class) &&
          (my_version>=drv_entry->bus_version) &&
          !strcmp(drv_name, drv_entry->drv_name) &&
          drv_entry->drv_init) {
          drv_entry->drv_init(dev_node, my_ops, my_id);
          if (dtreePropFind(dev_node, "active")) {
            svDriverRelease(drv_curr);
            break;
          }
        }
        drv_prev=drv_curr;
        drv_curr=svDriveLookupNext(drv_prev);
        svDriverRelease(drv_prev);
      }
    }
  }
  dev_node=dtreeNodePeer(dev_node);
}
```

Exhibit B

B-1—"DevRegEntry" structure

The fields of the "DevRegEntry" structure are as follows:
"dev_class" points to a string specifying the device class name.

"dev_ops" points to a structure of driver service routines.

"dev_id" points to a handle which is usually passed back to the driver (as first argument) each time a driver service routine is invoked.

"dev_node" specifies the device node in the tree which is serviced by driver. Note that a driver client must switch to the DKI therad context when accessing the device tree structure.

The "version" argument specifies the driver interface version implemented by the device driver instance. Basically, the "dev_class" field and "version" argument specify API implemented by the driver, Such an API is provided to driver clients as a structure of indirect functions implementing the API service routines. For instance, the "uart" device API is specified by the "UartDevOps" structure, the "timer" device API is specified by the "TimerDevOps" structure. A pointer to such a structure is obtained by a device driver client from the "dev_ops" filed of the device registry entry.

The "shared" argument specifies if the device driver instance may be shared between multiple clients. In other words, it indicates if the registered instance may be looked up multiple times.

The "handler" argument specifies the driver handler which is invoked by the device registry module as an acknowledge to a shut-down event (see "svDeviceEvent"). "handler" is called when the last reference to the device registry entry goes away and a shut-down event has been previously signalled on the entry. "entry" is passed back to the driver as the argument of "handler". In case of success, a non zero "DevRegId" is returned, otherwise NULL is returned.

Device registry assigns a logical unit number to the physical device. The logical unit number is unique within "dev_class". Basically, the device registry handles a logical unit counter per device class. All counters are initialized to zero. Each time a new device entry is allocated, the current counter value is assigned to the entry logical unit number and the counter is incremented. Thus, the logical device order within class corresponds to the allocation order. The logical unit number is mainly used by device driver clients to iterate through a given device class looking for a certain device. Using a valid logical unit number, a client is able to access the corresponding device registry entry, in particular, the "dev_node" field which points to the device node. The physical device corresponding to a given logical unit number may then be detected by the device node properties and the node position within the device tree. Note that the device driver may allocate (and then register) multiple entries in order to declare different classes (APIs) for the same physical device. For instance, a driver may implement orthogonal sets of operations like power management which are additional to the main device functionality. Another example is a device driver servicing a multi-function device. Such a driver would register multiple entries: one entry per device function. Note that, from clients point of view, such a device would be visible as multiple (mono-function) independent devices.

B-2—Basic calls of DKI Thread

B-2.1. svDkiThreadCall (A-2.1) synchronously invokes a routine in the context of the DKI thread. Synchronously means that the caller is blocked until the invoked routine returns.

B-2.2. svDkiThreadTrigger (A-2.2), asynchronously invokes a routine in the context of the DKI thread. Asynchronously means that the function immediately returns to the caller without waiting for the invoked routine to return. If the driver needs to know when the handler returns, it should use any synchronization mechanism inside the handler itself.

In both case, the "token" argument is the address of a DkiCallToken structure which must be allocated by the caller. This structure is opaque for the driver, and is used only by the DKI thread. The same structure may be reused for subsequent call (once the handler is invoked, in the case of "svDkiThreadTrigger"). The "handler" argument specifies the routine to call, and the "cookie" argument specifies the argument to pass to the "handler" routine when called.

B-3—Device tree functions

B-3.1—Tree browsing

"dtreeNodeRoot" returns the root device node if the device tree is not empty, otherwise NULL is returned.

"dtreeNodeChild" returns the first child node from the children list. NULL is returned when the children list is empty.

"dtreeNodePeer" returns the next device node from the sibling list, if any, otherwise NULL is returned. The "node" argument specifies the current device node in the sibling list.

"dtreeNodeParent" returns the parent device node, if any, otherwise NULL is returned. The "node" argument specifies the child device node.

B-3.2—Node management

"dtreeNodeAlloc" allocates a new device node object. A non zero "DevNode" cookie is returned in case of success, otherwise NULL is returned. Allocated node has neither parent nor child nodes. There are no properties attached to the newly allocated node.

"dtreeNodeFree" releases the memory allocated by the node object and all property objects attached to the node. The "node" argument specifies the node object being released.

"dtreeNodeAttach" adds the device node specified by the "cnode" argument in the child list of the parent node specified by the "pnode" argument.

"dtreeNodeDetach" detaches the node object specified by the "node" argument from its parent (if any). When "node" specifies the root node, the device tree becomes empty.

B-3.3—Node properties

"DevProperty" is an abstract type designating a device property object, and is opaque for the driver, "dtreePropFind" searches the first property within the properties list of the device node specified by the "node" argument. If the "name" argument is not NULL, "dtreePropFind returns the first property whose name matches the "name" string. If the "name" argument is NULL, "dtreePropFind" returns the first property from the list regardless of its name. In case of success, a non zero "DevProperty" cookie is returned, otherwise NULL is returned. Once the first property is found, the "dtreePropFindNext" routine may be used in order to find a subsequent property in the list.

"dtreePropFindNext" searches the next property within the properties list. The current position within the properties list is specified by the "prop" argument. If the "name" argument is not NULL, "dtreePropFindNext" returns the next property (with respect to the current position) whose name matches the "name" string. If the "name" argument is NULL, "dtreePropFindNext" returns the next property from the list (with respect to the current position) regardless of its name. In case of success, a non zero "DevProperty" cookie is returned, otherwise NULL is returned. The "dtreePropFind" and "dtreePropFindNext" pair is typically used to iterate through either all device node properties or a subset of device node properties whose names match a given name. In case when an user knows that there is only one property with a given name attached to the device node, a single "dtreePropFind" invocation is enough.

"dtreePropLength" returns the property value length (in bytes). The property object is specified by the "prop" argument.

"dtreePropValue" returns a pointer to the first byte of the property value. The property object is specified by the "prop" argument. A driver can read and write the property value directly using the returned pointer. Typically, the driver will cast the pointer to a well known type/structure in order to access the property value. Note that the property value must always be presented in the CPU endian format.

"dtreePropName" returns a pointer to an ASCII string which designates the property name. The properly object is specified by the "prop" argument.

"dtreePropAlloc" allocates a new device property object. A non zero "DevProperty" cookie is returned in case of success, otherwise NULL is returned. The "name" argument specifics the property name. The, "length" argument specifics length of the property value. The property value is undefined. The allocated property object is not attached to any device node. Once the property value is initialized, the property object can be attached to a node (i.e. added to the node properties list) using the "dtreePropAttach" function.

"dtreePropFree" releases the memory allocated by the property object. The "prop" parameter specifies the property object being released. Note that the property object must not be attached to any device node.

"dtreePropAttach" adds the property object specified by the "prop" argument to the node properties list. The "node" argument specifies the device node to which the property will be attached.

"dtreePropDetach" detaches the property object from the device node to which it is attached (if any). The "prop" argument specifies the property object.

B-3.4—high level services

"dtreeNodeAdd" allocates a new device node object, and add it to the children list of the given "parent" device node. The "name" argument specifies the name of the new allocated device node. That means a "node" property is allocated and attached to the new node having the value specified by "name". In case of success, the new allocated node object is returned, otherwise, a NULL pointer is returned.

"dtreeNodeFind" looks for a named node in the children list of a given device node. The "parent" argument specifies the device node of which the children list should be searched. The "name" argument specifies the value which must match the "node" property value of the searched node. In case of success, the matching node object is returned, otherwise a NULL pointer is returned.

"dtreePropAdd" allocates a new property, sets its value and attaches it to a given device node. The "node" argument specifies the node to which the new property must be attached. The "name" argument specifies the name of the new property to allocate. The "length" argument specifics the memory size in bytes to allocate for the new property value. The "value" argument specifies the value to be set for the new allocated property. In case of success, the new allocated property object is returned, otherwise, a NULL pointer is returned.

B-4—Device registry operations

B-4.1. "svDeviceAlloc" in A-4.1 allocates a device registry entry for a given device driver instance. Note that the entry is allocated in invalid state. This means that the entry is not included in the registry, i.e. it is not visible for clients via "svDeviceLookup". The entry becomes valid (i.e. visible for clients) when a subsequent "svDeviceRegister" is invoked. On the other hand, the driver is allowed to call "svDeviceEvent" on such an entry. Shut down events signalled on an invalid entry are memorized by the device registry and they are processed when the entry becomes valid (i.e. when "svDeviceRegister" is called). The "entry" argument points to the "DevRegEntry" structure which designates the device driver instance.

B-4.2. "svDeviceRegister" in A-4.2 adds a given device registry entry to the registry. The entry must be previously allocated by "svDeviceAlloc". The entry becomes valid (and therefore visible for clients) only if (here is no shut-down event signalled on the entry. Otherwise, the entry remains invalid and the device registry module invokes "handler" previously specified via "svDeviceAlloc. A pointer to the "DevRegEntry" structure (previously specified via "svDeviceAlloc") is passed back to the driver as the argument of "handler". The "handler" routine is called in the DKI thread context. Note that when "handler" is called the entry is no more registered. Thus, it is useless to invoke "svDeviceUnregister" once "handler" is called. On the other hand, in order to free memory resources, the driver should release the device registry entry invoking "svDeviceFree" once the entry is no more used by the driver (Typically, the entry is no more used by the driver when the connection to the parent bus/nexus driver is closed, i.e. when the parent driver is unable to invoke a call-back handler signalling an bus/nexus event).

B-4.3. "svDeviceUnregister" in A-4.3 removes the device entry specified by the "dev_id" argument from the device registry (if the entry is valid). "svDeviceUnregister" returns the following results:

"K_OK" if the device entry is successfully removed from the registry.

"K_EBUSY"
  if the device entry is not removed from the registry because it is locked by a driver client (the "svDeviceLookup/Release" pairs are not balanced), or when an invalid entry is specified.

The driver must remove all related device entries from the registry prior to be unloaded from the system. Typically, "svDeviceUnregister" is issued by the device driver (for each device driver instance) when the driver code is requested to be unloaded via "drv_unload". The driver unload fails when the driver code is still used by the system.

B-4.4. "svDeviceEvent" in A-4.4 notifies the device registry module that a shutdown event has occurred (e.g. hot-pluggable device has been removed). The shutdown event basically means that the driver instance must not be used any more by driver clients and the device entry must be removed from the registry (i.e. the driver instance will disappear). The shutdown event is immediately propagated to all driver clients in order to stop the device usage and to release the device entry as soon as possible. The device is specified by the "dev_id" argument. "svDeviceEvent" propagates the shutdown event invoking the "event handler" routines specified by the driver clients in "svDeviceLookup". The "event" and "arg" arguments are opaque for the device registry. They are passed (as arguments) to the client event handlers. "event" specifies the reason of shutdown as follows:

DEV_EVENT_SHUTDOWN for normal device shut down,

DEV_EVENT_REMOVAL for hot-plug (surprise) device removal.

"arg" is "event" specific. All driver clients are requested to release the device entry (as soon as possible) invoking the "svDeviceRelease" routine. Note that, prior to the shutdown event propagation, "svDeviceEvent" removes the device entry from the registry in order to prevent the entry to be found (and locked) by new driver clients. Once all driver client handlers are invoked, "svDeviceEvent" returns to the driver. Note that the real device shutdown has to be deferred until the "handler" routine invocation.

Once the device entry is released by the last driver client, the device registry module invokes "handler" previously specified via "svDeviceAlloc". A pointer to the "DevRegEntry" structure (previously specified via "svDeviceAlloc") is passed back to the driver as the argument of "handler". The "handler" routine is called in the DKI thread context. Typically, "svDeviceEvent" is used by a device driver servicing a hot-pluggable device.

"svDeviceEvent" is invoked by the device driver when the driver is notified (by its parent driver) that the device is removed from the bus. Note that in case of hot-plug removal, the device driver must be still operational until the device entry is released (ignoring all requests to the driver, for example). Note that the driver is allowed to call "svDeviceEvent" on an invalid (unregistered) entry. In such a case, "handler" will be invoked only when an attempt of registration will be made, i.e. "svDeviceRegister" will be invoked. In addition, such a registration will fail and the entry will remain invalid.

B-4.5. "svDeviceFree" in A-4.5 releases a given device registry entry previously allocated by "svDeviceAlloc". The device entry being released is specified by the "dev_id" argument. The entry being released must be invalid (unregistered). Thus, if the entry has been registered by "svDeviceRegister", the driver is allowed to release it if either the entry is successfully unregistered by "svDeviceUnregister" or "handler" (previously specified by "svDeviceAlloc") is invoked.

B-4.6. "svDeviceLookup" in A-4.6 searches the device entry in the registry matching the specified device class and logical unit. The arguments are as follows:

"dev_class" specifies the device class.

"dev_version" specifies the minimum device driver interface version required.

"dev_unit" specifies the logical device unit in the class.

"cli_handler" specifies the event handler which is called when a device event is signalled.

"cli_cookie" specifies the first argument of "cli_handler".

"cli_id" is an output argument identifying the client token on the matching device entry. This "cli_id" is passed back as an argument to "svDeviceEntry" to get the associated device entry, or to "svDeviceRelease( )" to release the device driver instance.

"svDeviceLookup" returns the following results:

"K_OK" if the device entry matching the "dev_class" and "dev_unit" pair is found in the registry.

"K_EBUSY" if the device entry matching the "dev_class" and "dev_unit" pair is found in the registry. On the other hand, the device is already looked up by another client and the device sharing is not allowed.

"K_EUNKNOWN" if there is no device entry in the registry matching "dev_class".

"K_UNDEF" if there is no device entry in the registry matching "dev_unit" in the "dev_class". On the other hand, there is a device entry in the "dev_class" with logical unit greater than "dev_unit". In other words, "dev_unit" falls into a hole in the "dev_class" unit ranges or if the device entry matching the "dev_class" and "dev_unit" pair found in the registry, implements a version of interface older than the required one.

"K_ETOOMUCH" if there is no device entry in the registry matching "dev_unit" in the "dev_class". Moreover "dev_unit" is greater than all existing logical units in the "dev_class".

In case of success, the corresponding device entry is locked in the registry until a subsequent "svDeviceRelease". Note that the device registry lock may or may not be exclusive, depending on the value of the "shared" argument specified in "svDeviceAlloc". In other words, the device may be shared between multiple driver clients, if "shared" was TRUE at registration time.

The device driver instance must not disappear while its device entry is locked in the registry. In case of a catastrophic device shutdown (e.g. hot-plug removal) the device entry lock owners are notified (through the "cli_handler" routine invocation) that the device entry must be released as soon as possible.

B-4.7. "svDeviceEntry" in A-4.7 returns the device entry associated with a given client identifier. The "cli_id" argument specifies the client identifier previously returned by "svDeviceLookup".

B-4.8. "svDeviceRelease" in A-4.8 routine releases the lock on the given device entry. The device entry is specified by the "cli_id" argument. Obviously, a device driver client must no more access the device driver instance and the device nude once the device entry has been released.

B-5—"DrvRegEntry" structure

The "DrvRegEntry" structure has the following fields:

"drv_name" points to a string specifying the driver name (e.g. driver file name).

"drv_info" points to a string specifying an extra information about driver component (e.g. version, author).

"bus_class" points to a string specifying the class of the parent driver API required for the driver (e.g. "pci").

"bus_version" specifies the minimal version of the parent driver API required for the driver. Note that if a bus/nexus driver provides an API version which is less than "bus_version", the corresponding driver component will never he called by such a bus/nexus driver. In other words, the "drv_probe", "drv_bind" and "drv_init" routines will never be invoked by such a bus/nexus driver.

"drv_probe" points to a static driver routine which performs the device enumeration/probing on the bus.

"drv_bind" points to a static driver routine which performs the driver-to-device 30 binding.

"drv_init" points to a static driver routine which clones an instance of driver for the given device.

"drv_unload" points to a static driver routine which is invoked by the driver registry module when somebody wishes to unload the driver code from the system.

B-6—Driver registry operations

B-6.0. "svDriverRegister" adds the driver entry to the driver registry. It returns "K_OK" in case of success, otherwise K_ENOMEM is returned to indicate the system is out of memory. The "drv_entry" argument points to a "DrvRegEntry" structure specifying driver properties and static driver routines.

B-6.1. "svDriverLookupFirst" in A-6.1 returns the first driver entry in the registry. When the registry is not empty a non zero "DrvRegId" (designating the entry) is returned, otherwise NULL is returned. In case of success, the driver entry is locked in the registry. It should be unlocked by a subsequent invocation of "svDriverRelease" or "svDriverUnregister". The driver entry lock is not exclusive. It is just a counter which prevents the driver component to be unloaded when it is still used by a bus/nexus driver for the probing or initialization.

B-6.2. "svDriverLookupNext" in A-6.2 returns the next driver entry in the registry. The current entry is specified by the "drv_id" argument. The current entry must be locked by a previously called "svDriverLookupFirst" or "svDriverLookupNext". If the current entry is not the last one in the registry a non zero "DrvRegId" (designating the entry) is returned, otherwise NULL is returned. In case of success, the next driver entry is locked in the registry. It should be unlocked by a subsequent invocation of "svDriverRelease" or "svDriverUnregister".

B-6.3. "svDriverRelease" in A-6.3 releases the lock of the driver entry specified by the "drv_id" argument.

B-6.4. "svDriverEntry" in A-6.4 returns a pointer to the driver entry structure specified by the "drv_id" argument. The driver entry being accessed must be previously locked using "svDriverLookupFirst" or "svDriverLookupNext". Note that the driver entry structure is read-only.

B-6.5. "svDriverCap" in A-6.5 returns a pointer to the driver actor capability. The driver entry is specified by the "drv_id" argument. The driver entry being accessed must be previously locked using "svDriverLookupFirst" or "svDriverLookupNext". Note that if a given driver entry is registered by a builtin driver, a NULL pointer is returned. In other words, the driver actor capability makes sense only for dynamically loaded drivers. The actor capability may be used by an application in order to delete the driver actor once the driver entry is unregistered. Note that the driver capability structure is read-only.

B-6.6. "svDriverUnregister" in A-6.6 tries to remove the driver entry specified by the "dev_id" argument from the driver registry. The device entry being removed must be previously locked using "svDriverLookupFirst" or "svDriverLookupNext". In case of success, "K_OK" is returned, otherwise "K_EBUSY" is returned. Basically, the "K_EBUSY" result means that either the driver entry is locked in the driver registry (i.e. a static driver routine is currently used by a bus/nexus driver) or an instance of device driver is locked in the device registry (i.e. there is a driver instance which is currently used by a driver client). When "K_EBUSY" is returned, the driver entry remains locked in the registry and should be unlocked explicitly by "svDriverRelease".

B.7

The probe routine gives an opportunity to the driver to discover a device (which can be serviced by the driver) residing on the bus/nexus and to create the device node associated with this device in the device tree.

B.8

The "drv_bind" routine is invoked by a bus/nexus driver when "bus_class" specified in the registry entry matches the bus/nexus driver class. "drv_bind" is called with one argument ("dev_node") specifying a given device node. The "drv_bind" routine gives an opportunity to the driver to perform a driver-to-device binding. Typically, the driver examines properties attached to the device node in order to determine the type of device and to check whether the device may be serviced by the driver. (The properties taken into account by the driver are typically bus architecture specific. For instance, a PCI driver would examine the vendor and device identifier properties.).

If the check is positive, the driver binds the driver to the device node attaching a "driver" property to the device node. The property value specifics the driver name. The parent bus driver uses such a property to determine the name of driver servicing the device. In other words, via the "driver" property, the child driver gives its name to the parent bus driver asking to invoke the "drv_init" routine on that device. Note that the "drv_bind" routine should normally do nothing if a "driver" property is already present in the device node. In order words, "drv_bind" should not override an existing (most likely explicit) driver-to-device binding. The "drv_bind" routine is optional. In case when the "drv_bind" routine is not provided by the driver, the "drv_bind" field must be set to NULL.

B.9

Once the driver-to-device binding process is finished, the bus/nexus driver iterates through the child nodes and, for each device node, it tries to determine a driver component which should be applied to the given device. Once such a driver component is found, its "drv_init" routine is invoked the bus/nexus driver. The "active" property is used to filter out already active device. In addition, once the "drv_init" routine returns, the bus/nexus driver checks whether the device became active, and if so, it terminates iteration for that device node. If the child device is not a leaf one, the initialization process is recursively continued by the "drv_init" routine of the child driver.

What is claimed is:

1. A computer comprising:
 a processor, a memory, and devices,
 a program memory area, for storing an operating system, drivers, and driver client code,
 each driver having a global driver section comprising driver program code and global driver data, both defining driver operations associated with a corresponding class of devices,
 for operative ones of the devices, an associated driver instantiation comprising local driver data, having an internal pointer to the global driver section of the instantiated driver,
 the local driver data in at least certain of the driver instantiations further having at least one external pointer to another driver instantiation,
 a device registry, forming a list of device registry entries, each corresponding to a respective one of the driver instantiations,
 said driver client code being capable of performing operations on a given device by:
  fetching in said device registry a pointer to the driver instantiation associated with the given device,
  performing the operations on the given device by using operations provided by the associated driver instantiation, directly or using further operations reached in other driver instantiations by using iteratively said external pointer.

2. A computer according to claim 1, wherein said local driver data further comprise local device data, defining a current condition of the device associated with the driver.

3. A computer according to claim 1, further comprising device tree data, defining a tree representation of at least some of said devices, in which each device node represents a device and its device characteristics, and identifies at most one driver capable of managing that device.

4. A computer according to claim 3, wherein said device registry entry further comprises a node identifier, defining an associated node in the device tree.

5. A computer according to claim 3, wherein said global driver section comprises code adapted to implement at least one of the following special operations:
 probing driver serviceable devices,
 binding a driver serviceable device with the driver,
 initializing a driver instantiation with the bound device,
 unloading an existing driver instantiation.

6. A computer according to claim 5, further comprising a driver registry, forming a list of driver registry entries, each comprising at least one pointer to said special operations.

7. A computer according to claim 6, wherein said driver registry directly or indirectly defines device-independent driver characteristics, comprising a driver identifier and a parent driver class identifier.

8. A computer according to claim 6, wherein said global driver section comprises code adapted to self register the driver in said driver registry.

9. A computer according to claim 6, wherein, for at least intermediary ones of the drivers, said special operation of initializing the driver further comprises sub-node initialization operations.

10. A computer according to claim 9, wherein said sub-node initialization operations comprise inspecting the driver registry to find child drivers which match the driver being considered.

11. A computer according to claim 10, wherein said sub-node initialization operations comprise initiating a special operation of probing driver serviceable devices in such child drivers.

12. A computer according to claim 6 or claim 11, wherein said special operation of probing driver serviceable devices comprises creating corresponding device nodes in the device tree.

13. A computer according to claim 12, wherein said sub-node initialization operations further comprise allocating resources to each child driver serviceable device.

14. A computer according to claim 12, wherein said sub-node initialization operations further comprise binding a child driver with a corresponding device in said device tree.

15. A computer according to claim 14, wherein said sub-node initialization special operations further comprise initializing the child driver, which results into a nested implementation of said sub-node initialization operations when said child driver is itself an intermediate driver.

16. A computer according to claim 5, wherein, for at least other drivers than the intermediary ones, said driver special operation of initializing a driver instantiation for the bound device further comprises registering the new driver instantiation in the device registry.

17. A computer according to claim 5, wherein said operating system contains code for launching said sub-node operations in a driver bound to a given device in the device tree.

18. A computer according to claim 17, wherein said code for launching said sub-node operations comprises a synchronizing thread in the nucleus of said operating system.

19. A computer according to claim 17, wherein said operating system is active upon computer start to initiate said code for launching said sub-node operations in a driver bound to the main bus.

20. A computer according to claim 17, wherein said operating system is active upon detection of a new driver to initiate said code for launching said sub-node operations in a driver bound to the main bus.

21. A computer according to claim 17, wherein said operating system is active, upon detection of a new device by an intermediate device, to initiate said code for launching said sub-node operations in the driver corresponding to the intermediate device.

22. A computer according to claim 17, wherein said operating system is arranged to de-activate the corresponding driver instantiation, upon detection of a device removal.

23. A method of managing drivers in a computer, comprising:
   a. providing each driver with a global driver section comprising driver program code and global driver data, both defining driver operations associated with a corresponding class of devices,
   b. for each operative one of the devices, providing an associated driver instantiation comprising local driver data, having an internal pointer to the instantiated driver, the local driver data in at least certain of the driver instantiations further having at least one external pointer to another driver instantiation,
   c. providing a device registry, forming a list of device registry entries, each corresponding to a respective one of the driver instantiations, whereby a device call may be directed to the device registry, to reach the driver instantiation corresponding to the device being called, and performing operations on a given device by:
      fetching in said device registry a pointer to the driver instantiation associated with the given device, and
      performing the operations on the given device by using operations provided by the associated driver instantiation, directly or using further operations reached in other driver instantiations by using iteratively said external pointer.

24. The method of claim 23, wherein said local driver data of step b. further comprise local device data, defining a current condition of the device associated with the driver.

25. The method of claim 23, further comprising the step of: d. providing device tree data, defining a tree representation of at least some of said devices, in which each device node represents a device and its device characteristics, and identifies at most one driver capable of managing that device.

26. The method of claim 25, wherein each said device registry entry of step c. further comprises a node identifier, defining an associated node in the device tree.

27. The method of claim 25, wherein said global driver section of step a. further comprises code adapted to implement at least one of the following special operations: a1. probing driver serviceable devices, a2. binding a driver serviceable device with the driver, a3. initializing a driver instantiation with the bound device, a4. unloading an existing driver instantiation.

28. The method of claim 27, further comprising the step of: e. providing a driver registry, forming a list of driver registry entries, each comprising at least one pointer to said special operations.

29. The method of claim 28, wherein said driver registry of step e. directly or indirectly defines device-independent driver characteristics, comprising a driver identifier and a parent driver class identifier.

30. The method of claim 29, wherein said global driver section of step a. comprises code adapted to self register the driver in said driver registry.

31. The method of claim 29, wherein, for at least intermediary ones of the drivers, said special operation a1. of initializing the driver further comprises sub-node initialization operations.

32. The method of claim 31, wherein said sub-node initialization operations comprise: a10. inspecting the driver registry to find child drivers which match the driver being considered.

33. The method of claim 32, wherein said sub-node initialization operations comprise a11. initiating a special operation of probing driver serviceable devices in such child drivers.

34. The method of claim 27 or claim 32, wherein said special operation of probing driver serviceable devices further comprises creating corresponding device nodes in the device tree.

35. The method of claim 34, wherein said sub-node initialization operations further comprise defining resources requirements for each child driver serviceable device.

36. The method of claim 35, wherein said sub-node initialization operations further comprise: a12. binding a child driver with a corresponding device in said device tree.

37. The method of claim 36, wherein said sub-node initialization special operations further comprise: a13. initializing the child driver, which results into a nested implementation of said sub-node initialization operations when said child driver is itself an intermediate driver.

38. The method of claim 27, wherein, for at least other drivers than the intermediary ones, said driver special operation of initializing a driver instantiation for the bound device further comprises registering the new driver instantiation in the device registry.

39. The method of claim 31, further comprising the step of: f. providing the operating system of the computer with code for launching said sub-node operations in a driver bound to a given device in the device tree.

40. The method of claim 39, wherein said code for launching said sub-node operations of step f. comprises a synchronizing thread in the nucleus of said operating system.

41. The method of claim 39, wherein step f. is implemented upon computer start with a driver bound to the main bus.

42. The method of claim 39, wherein step f. is implemented during computer operation, upon detection of a new driver, with a driver bound to the main bus.

43. The method of claim 39, wherein step f. is implemented during computer operation, upon detection of a new device by an intermediate device, with the driver corresponding to the intermediate device.

44. The method of claim 39, further comprising the step of: g. providing the operating system of the computer with code operable upon detection of a device removal to launch de-activation of the corresponding driver instantiation.

45. A driver stored on a computer readable medium for use in a computing system, having a global driver section comprising driver program code and global driver data, both defining driver operations associated with a corresponding class of devices, and a driver initialization operation enabling the construction of driver instantiations comprising local driver data, having an internal pointer to the instantiated driver, the local driver data having at least one external pointer to another driver instantiation, and wherein the driver is operable to perform operations on a given device by:
   fetching in a device registry a pointer to the driver instantiation associated with the given device, and performing the operations on the given device by using operations provided by the associated driver instantiation, directly or using further operations reached in other driver instantiations by using iteratively said external pointer.

46. A driver according to claim 45, wherein said local driver data further comprises a driver registry entry.

47. A driver according to claim 45, wherein said global driver section further defines an operation of self-registration in a driver register.

48. A driver according to claim 45, wherein said global driver section further defines an operation of probing driver serviceable devices.

* * * * *